United States Patent
Iwade et al.

[11] Patent Number: 5,996,925
[45] Date of Patent: Dec. 7, 1999

[54] METHOD AND APPARATUS FOR DETECTING YARN TENSION AND METHOD FOR WINDING YARN

[75] Inventors: Takashi Iwade, Souraku-gun; Masazumi Imae, Moriyama, both of Japan

[73] Assignee: Toray Engineering Co., Ltd., Osaka, Japan

[21] Appl. No.: 09/033,088

[22] Filed: Mar. 2, 1998

[30] Foreign Application Priority Data

Mar. 3, 1997 [JP] Japan .................................. 9-065478
Mar. 3, 1997 [JP] Japan .................................. 9-065479

[51] Int. Cl.⁶ .......................... B65H 59/38; B65H 77/00
[52] U.S. Cl. .................. 242/413.1; 73/160; 242/413.5; 242/485
[58] Field of Search ............................ 242/413.1, 413.3, 242/413.4, 413.5, 485; 73/160

[56] References Cited

U.S. PATENT DOCUMENTS

| | | | |
|---|---|---|---|
| 3,931,938 | 1/1976 | Hasegawa et al. | 242/413.3 |
| 4,169,565 | 10/1979 | Blok et al. | 242/486.7 |
| 4,393,725 | 7/1983 | Satterfield | 73/160 X |
| 4,441,367 | 4/1984 | Daws et al. | |
| 4,572,243 | 2/1986 | Felix | |
| 5,056,734 | 10/1991 | Uchida et al. | 73/160 X |
| 5,141,169 | 8/1992 | Sugioka | 242/413.1 |
| 5,710,432 | 1/1998 | Bell | 73/160 X |

FOREIGN PATENT DOCUMENTS

| | | |
|---|---|---|
| 0 551 115 | 7/1993 | European Pat. Off. . |
| 0 785 420 | 7/1997 | European Pat. Off. . |
| 2 082 323 | 3/1982 | United Kingdom . |
| WO 89/08733 | 9/1989 | WIPO . |

*Primary Examiner*—Michael R. Mansen
*Attorney, Agent, or Firm*—Burns, Doane, Swecker & Mathis, L.L.P.

[57] ABSTRACT

An apparatus, for measuring a yarn tension, capable of preventing a filament breakage or loop from being generated while eliminating the necessity of adjustment and keeping a desired precision of measurement. The apparatus is constructed by an unit 1 for an application of a vibration to a yarn being moved, an unit 2 for measuring an apparent transverse wave propagation velocity of the yarn, and a unit 3 for calculating a true transverse wave propagation velocity based on the yarn speed and the calculated apparent transverse wave propagation velocity of the yarn. A control of a winding of the yarn in accordance with a propagation velocity of the transverse wave is also disclosed.

6 Claims, 23 Drawing Sheets

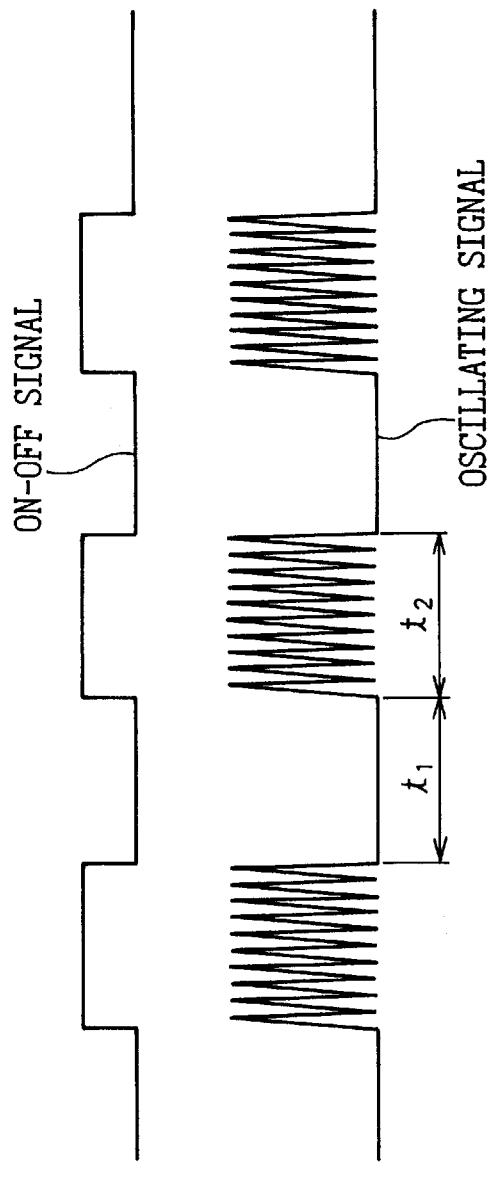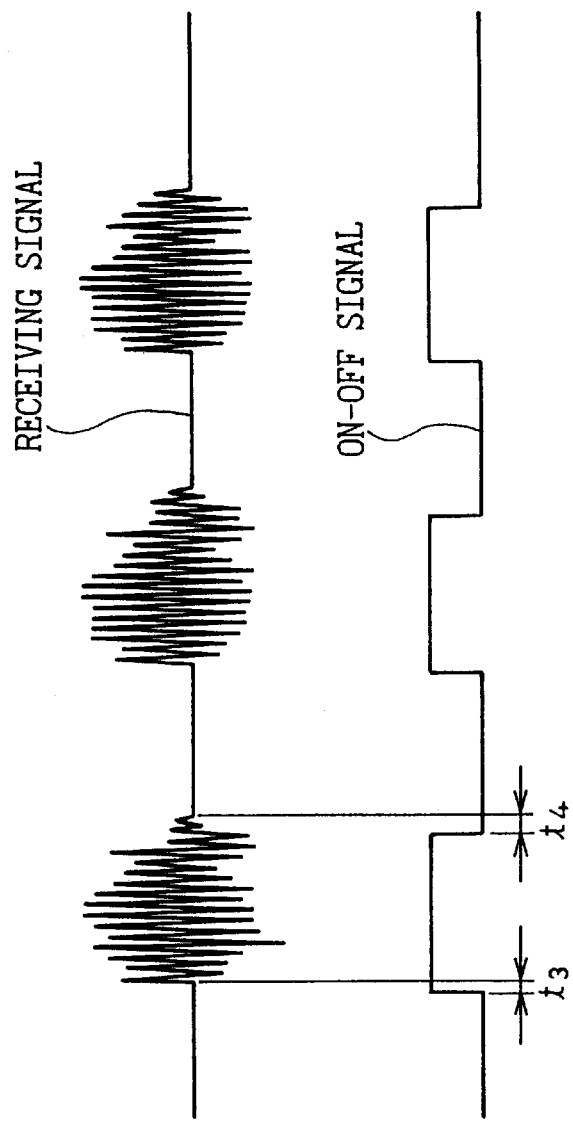

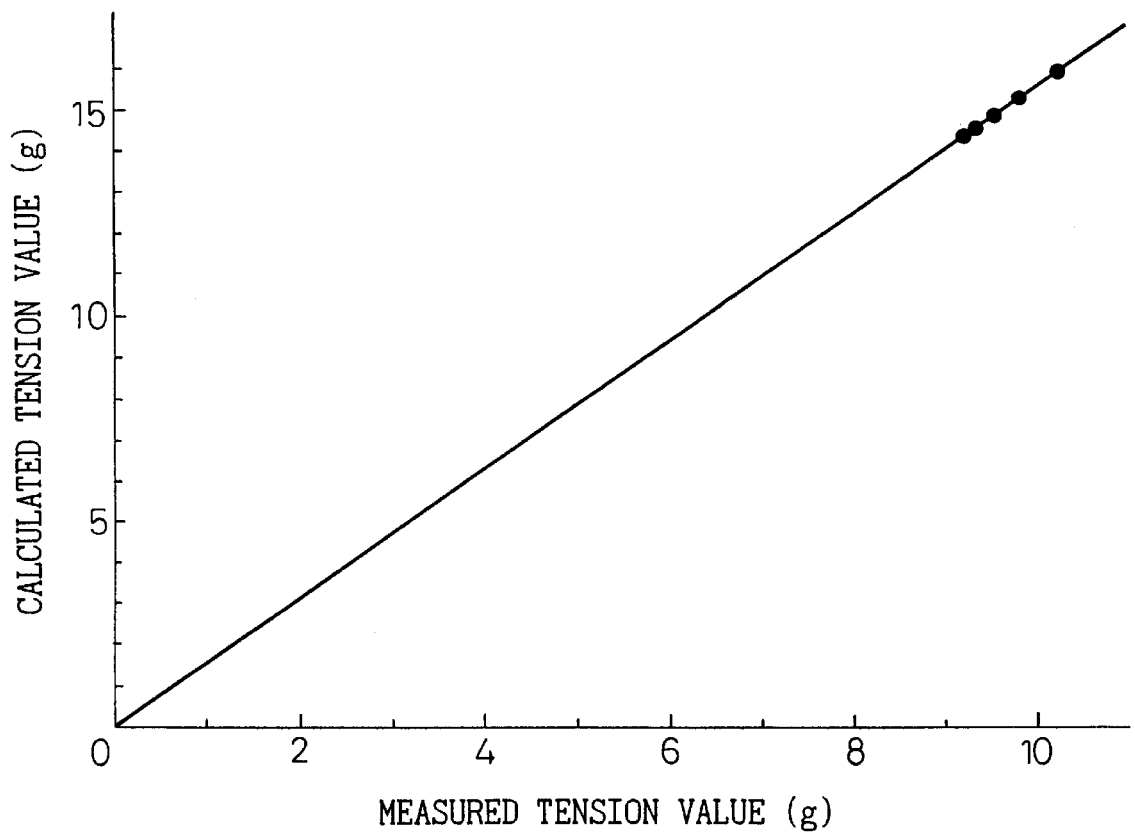

METHOD AND APPARATUS FOR DETECTING YARN TENSION AND METHOD FOR WINDING YARN

BACKGROUND OF THE INVENTION

1. Field of the Invention

The present invention is related to a method and an apparatus for detecting yarn tension and a method for winding a yarn.

2. Description of Related Art

As is well known, in a winding process of a synthetic fiber yarn, a desired value of yarn tension is varied in accordance with winding conditions, such as a thickness of the yarn, a feed speed of the yarn, and a kind of the yarn etc.

When the winding tension is excessively high, a so-called bulging phenomenon is generated, wherein a completed yarn package is subjected to a bulging at its side portions, which is likely to be subjected to rubbing during the transportation of the package in a container, which, during a subsequent package treating process, makes it difficult to take out the yarn smoothly. Furthermore, a so-called saddling phenomenon is generated, wherein the package is, at its central part of the periphery, depressed, which makes the yarn quality different between the central portion and end portion at the outer periphery of the package, which cause these parts to be dyed differently at a later stage. Furthermore, the excessively high tension causes an inner stress in the package to be increased, so that a so-called spiraling may be generated, where a portion of a yarn layer is displaced over the remaining portion due to a local relaxation of the yarn tension, resulting in worsening the unwinding performance of the package. Furthermore, a bobbin as a core of the package is subjected to an increased degree of a deformation, which make it difficult for the completed (full) package be easily detached from the corresponding spindle of the winding machine.

Contrary to this, an excessively small tension causes the movement of the yarn to be unstable, so that filaments constructing the yarn are apt to be separated or looped at a guide for guiding the movement of the yarn, which may cause the quality of the yarn to be reduced. Furthermore, the density of the package may be reduced, which makes it difficult for the package to keep a desired shape, so that the shape of the package is deformed during the execution of the winding process or during transportation of the package to the following treating process, which makes the package unusable. Furthermore, a constraint on the yarn during the execution of winding is not sufficiently strong, so that a so-called yarn shift phenomenon may be generated, by which a part of the yarn in an intermediate layer of a package is displaced toward the center of the package, which makes it difficult for the yarn part to be unwound.

In order to prevent above mentioned problems from occurring, it was heretofore been usual to execute a test winding process where a number of test windings are done by changing yarn taking up speed to determine a suitable taking up speed, i.e., a suitable yarn tension to obtain a desired shape of a completed package.

However, the thus determined yarn taking up speed can not permanently maintain the desired winding condition due to the fact that a yarn tension during the winding is made different from the desired yarn tension due to inevitable changes in winding condition such as a change in a room temperature, a small variation in a viscosity of a polymer material, a change in a process temperature and an abrasion of any yarn guiding member.

In view of the above, it is necessary, during the execution of the winding process, that monitoring of any change in a winding condition is done and that, based on the result of the monitoring, process control, such as modification of a winding condition or spinning condition or an operating condition of the winding system and a determination of a degree of a quality of the completed package, must be done.

Heretofore, two methods have been known for executing process control in a yarn winding process. The one is based on a measurement of a shape as well as a winding density of the completed package. The other is based on a continuous or periodical measurement of a yarn tension during the execution of the winding.

The first method where the yarn shape as well as winding density are measured is defective in a delayed detection of the fact that the winding is not suitable due to the fact that the detection of an undesired shape or winding density is possible only after the package formation is completed. The first method is also disadvantageous in that a temporally generated defect is "hidden" in the completed package, i.e., can not be found by merely inspecting an outer appearance of the completed package. Thus, it may be possible that a package including a hidden defect may be used at a following process such as a knitting. Furthermore, an abnormally increased tension, which may occur very rapidly, may inevitably cause the finished package to be completely damaged.

In the second idea based on a continuous or periodical detection of the yarn tension during an execution of a winding condition, a method has also been practiced, where the yarn tension is monitored continuously and a positive control of the taking up speed is done so that it is controlled predetermined constant value.

In order to detect the yarn tension, a so-called three point type tension measuring device having spaced fixed yarn guides 61 and 62, a movable guide 63 arranged between the guides 61 and 62 and a displacement sensor (strain gauge) 64 for detecting a movement (deflection), as shown in FIG. 27 has heretofore been usually used.

In this type of a tension measurement device, a detecting signal does not detect an absolute value of the yarn tension. Thus, a calibration of the detected value is essential. It is ideal that such a calibration is done with respect to a yarn subjected to a movement at a speed corresponding a speed of a yarn during a winding such as a value larger than 3,000 m/min. However, from the practical view point, it is difficult to execute a calibration while the yarn is moved under such a high speed condition. Thus, generally, yarn tension is measured in a stationary yarn while being weighted in a range corresponding to a measuring range of tension. Then, a calibration is done in such a way that the measured value corresponds to the weight value.

However, it is quite often that the tension detecting device providing precise detected value during a stable state provides a different detected value when the yarn is moving. It is considered that such a difference of a measured value is generated by a small difference in various factors having different degree of influence to the measured value, such as a coefficient of friction of a guide due to a difference of a surface condition, a shape, a detecting position, and a thickness of the yarn, In other words, even if a tension measuring device of the same operating principle is used, the measured tension value may be different due to the difference in it precision, i.e., there is no compatibility between the measuring devices. Furthermore, the measured value is also influenced by a abrasion of a yarn guide caused by an aging.

In view of the above, in the prior art three point tension detector, there is lacking a compatibility in the detected (displayed) value. In other words, the optimum tension value determined at an actual winding test is a value intrinsic to the particular measurement system. Thus, the optimum tension value for a different detector is unknown. In other words, there is inevitable difference in the optimum tension value between the tension measuring devices. On the other hand, from the practical view point, a use of a plurality of tension measuring devices is inevitable in a factory for obtaining a high precision control of the winding state across the whole factory for a prolonged time. Thus, in view of the variation in detected valued between the devices and a change in the detected value due to aging, a precise evaluation of a defect can be done only when the defect is of a large degree. Thus, it is impossible that a package having a smaller defect is prevented from being fed to a subsequent process.

Furthermore, in the prior art method for controlling a yarn tension, if the detected values of the tensions of yarns are the same, values of real tension of the yarns being subjected to a winding may not be the same. Thus, the finished packages can no, be controlled to the same shape irrespective of a fact that the detected tension is the same.

In another prior art, a tension detecting device of a contact type of so-called FTS type is known, where a movable guide is arranged in a yarn path, so that a movement (deformation) of the movable guide is detected when the yarn during a traverse movement is made to contact the guide, so that a signal of the movement of the guide as an indicative of on a yarn tension is detected by a strain gauge.

This type of device for measurement of the yarn tension is advantageous over the three point type in FIG. 27 in having a smaller resistance force at the guide. However, a speed of a yarn higher than 3,000 m/min may also cause filament breakage or loop to be generated due to a change in the quality of the same yarn.

Furthermore, in both of the three point type and the FTS type, an adjustment is required periodically. In these sensors, the measured value of the movement of a movable guide is a value which is transformed into a value of the tension. Thus, a large difference between the yarn speed during the adjustment of the scale and the yarn speed during the measurement causes the error to increase. Furthermore, individual differences are also large.

In view of the above, Japanese Unexamined Patent Publication No. 59-88654 discloses a method where a yarn is subjected to vibration by means of an ultrasonic wave and a change in the condition of the vibration is detected by a detector, so that a yarn tension is known. In this method, a deviation of a vibration from a resonance point, which is determined by a yarn tension, is measured. Furthermore, by searching for a resonant frequency, a resonance point is found, which allows the yarn tension to be detected.

However, the above method for detecting a yarn tension by using a deviation of the vibration of the yarn by the ultrasonic wave is defective in that a large amount of deviation causes a change to be reduced in an amplitude due to the lack in a proportional relationship between the deviation and the amplitude, which makes it difficult to measure a yarn tension. Furthermore, during measurement of the change in the amplitude, the detected value varies in accordance with various conditions, such as contact condition between the ultrasonic detector and the yarn and a change in sensitivity of the ultrasonic detector, which necessitates a calibration at each of the detecting locations.

Furthermore, there exists a plurality of resonance frequencies, that are a first, second, . . . , n-th order of resonance frequencies, in the method for detecting a resonant point by seeking the resonance frequency, it is difficult to decide the order of the resonance merely from the amplitude of the frequency, which makes it difficult to determine the tension.

SUMMARY OF THE INVENTION

An object of the present invention to provide a method and apparatus for measuring yarn tension without generating a defect such as a filament breakage on a loop.

Another object the present invention is to provide a method and apparatus, for measuring a yarn tension, capable of increasing a precision in a measurement without being influenced by winding conditions such as the take-up speed or the type of yarn.

Further another object the present invention is to provide an apparatus for measuring a yarn tension, wherein a periodical adjustment is not needed.

Still another object of the present invention is to provide a method for winding yarn capable of keeping a desired shape of wound package.

According to an aspect of the present invention, a method is provided for detecting a factor related to a yarn tension, comprising steps of:

moving the yarn along a yarn path at a predetermined speed;

applying a vibration to the yarn at a first location in the yarn path so that a transverse wave is generated in the yarn, and;

detecting an apparent propagation velocity of the transverse wave as a factor of a yarn tension at a second location in the yarn path spaced from the first location.

According to another aspect of the present invention, an apparatus is provided for detecting a yarn tension, comprising:

means for moving the yarn along a yarn path;

means for applying a vibration to the yarn at a first location in the yarn path so that a transverse wave is generated in the yarn;

means for detecting an apparent propagation velocity of the transverse wave at a second location in the yarn path spaced from the first location;

means for calculating a true propagation velocity of the transverse wave based on a speed of the movement of the yarn and the apparent propagation velocity of the transverse wave, and;

means for calculating a yarn tension based on the true propagation velocity of the transverse wave.

According to the structure of the present invention, detection of a yarn tension can be done without making the yarn to be contacted with a guide, thereby preventing a filament breakage or loop from being generated.

According to another aspect of the present invention, a method is provided for winding a yarn, comprising steps of:

moving the yarn along a yarn path and winding the yarn to a package;

applying a vibration to the yarn at a first location in the yarn path so that a transverse wave is generated in the yarn;

detecting an apparent propagation velocity of the transverse wave at a second location in the yarn path spaced from the first location as a factor of a tension of the yarn, and;

controlling the winding of the yarn in accordance with the detected apparent propagation velocity of the transverse wave. Preferably, said controlling comprises a step of controlling the winding speed such that a propagation velocity of the transverse wave in the yarn is controlled to a value in a range 40 to 70 m/sec.

According to the winding method of the present invention, a winding of the yarn to a desired finished shape of a package is done by detecting the propagation velocity without making the yarn contact guide, resulting in a reduction in friction during a winding process, thereby reducing an error in controlling the yarn package to a desired shape.

Furthermore, according to the winding method of the present invention, a stable and precise control of a desired shape of a finished package is obtained for a prolonged time without being influenced by aging. Thus, the chances of generating defected packages is reduced, which may otherwise harm a following process such as knitting.

BRIEF EXPLANATION OF ATTACHED DRAWINGS

FIGS. 6(a) and (b) are timing charts illustrating a received signal and the on-off signal, respectively.

FIG. 7 is a relationship between a measured tension and a calculated tension.

Figure 8:
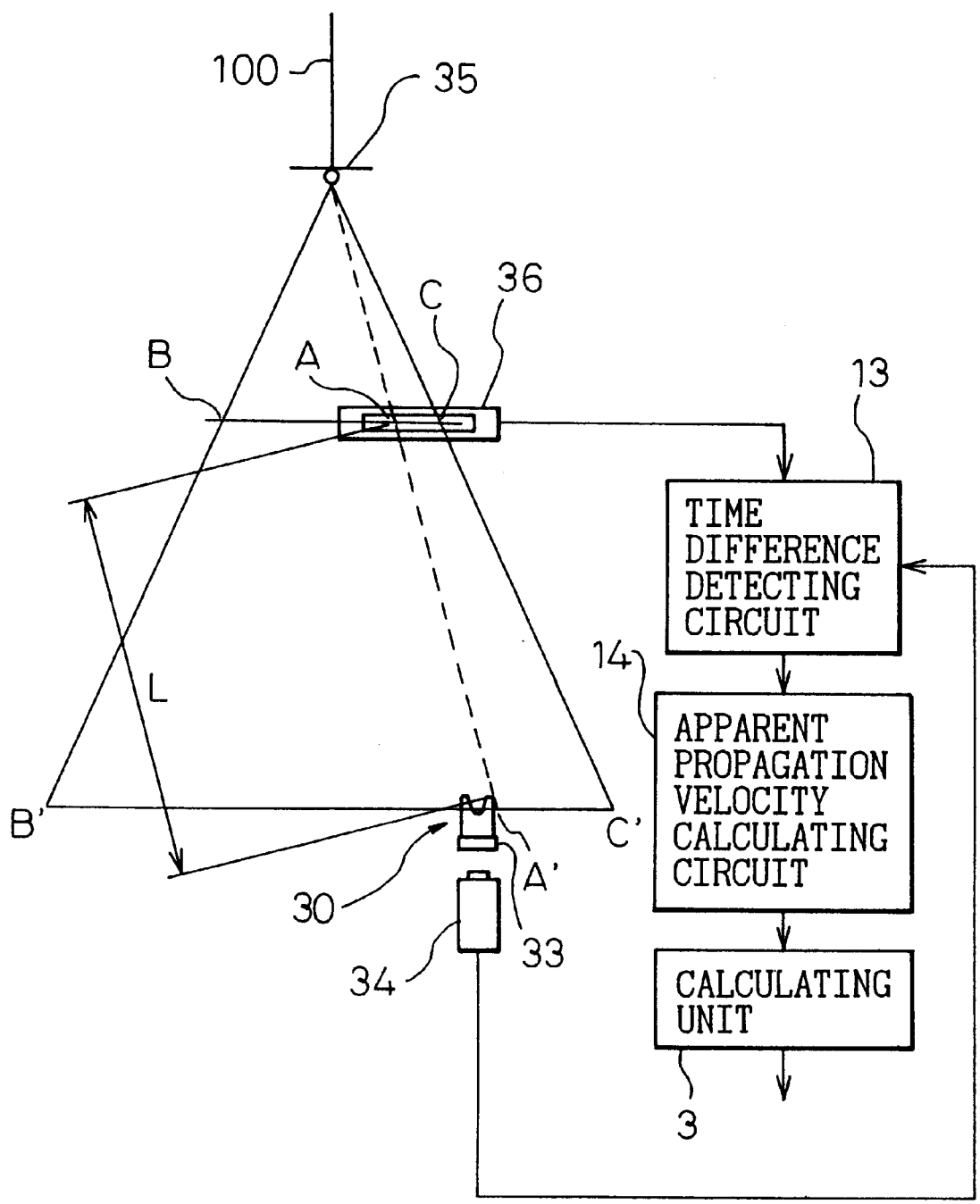

FIG. 8 illustrates a system for measuring a propagation velocity of a transverse wave in a yarn winding system having a yarn traversing mechanism.

Figure 9:
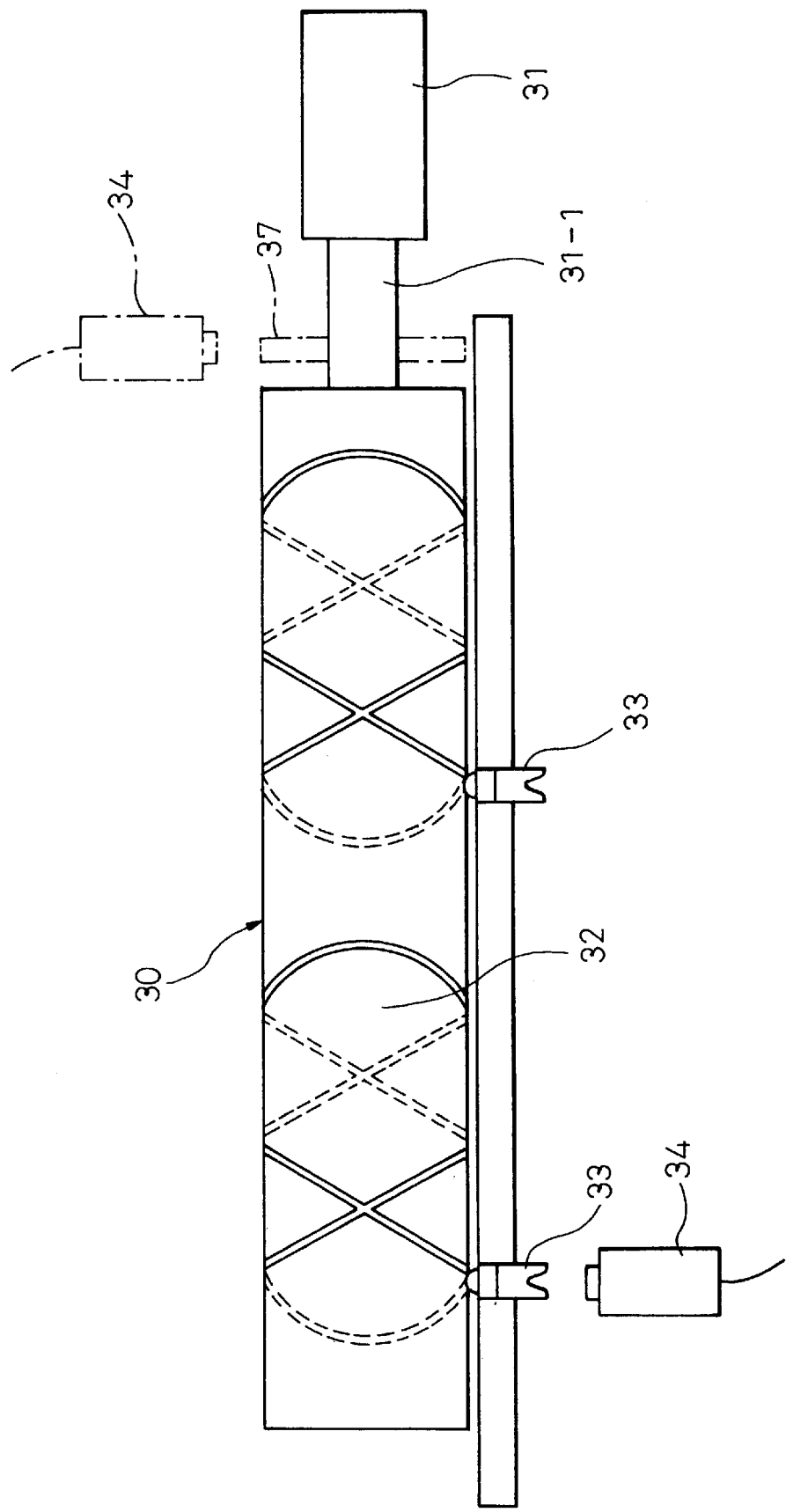

FIG. 9 is a schematic view of yarn traversing mechanisms used in FIG. 8.

Figure 10:
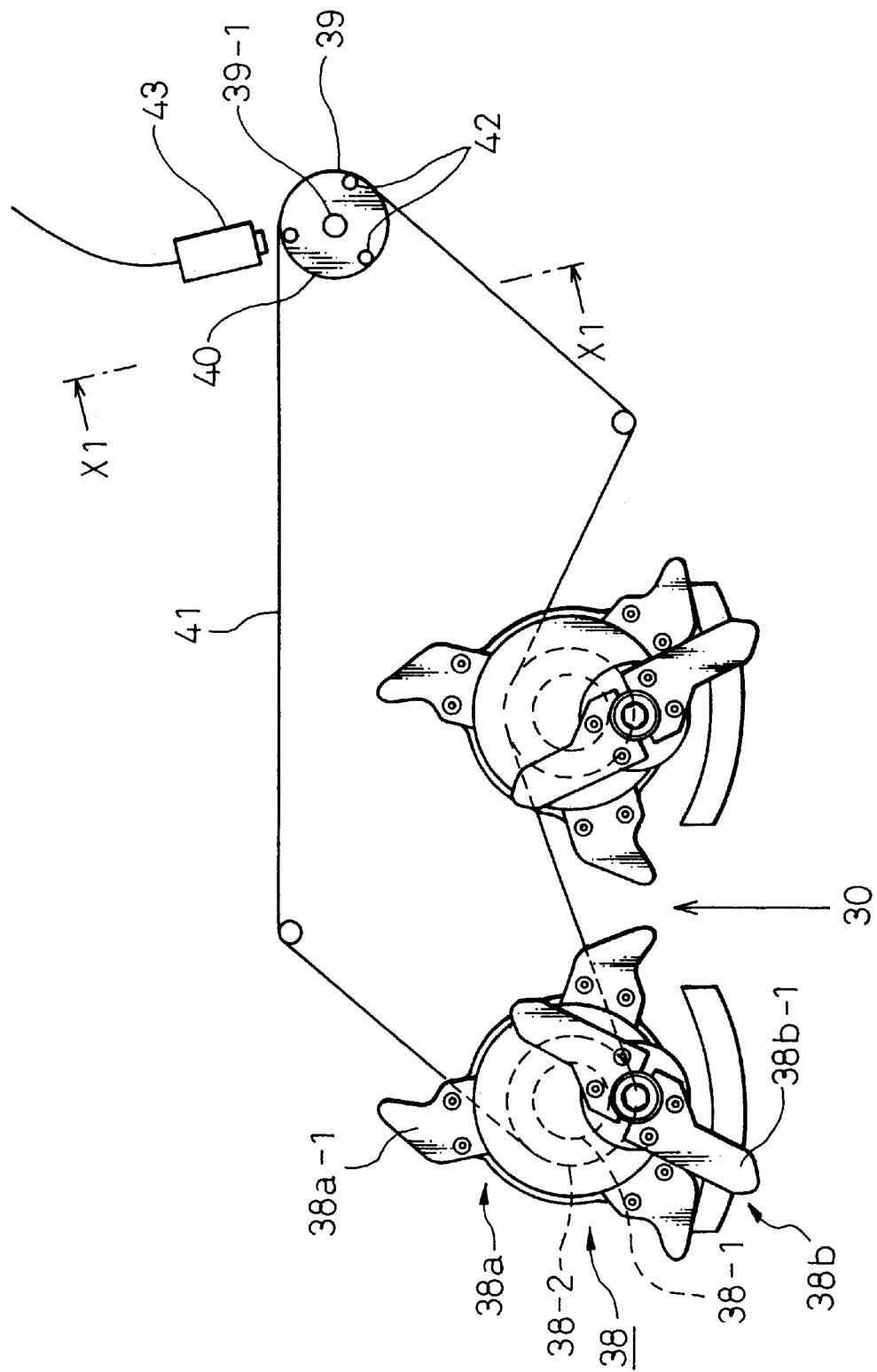

FIG. 10 is a modification of a traversing mechanism used in FIG. 8.

Figure 11:
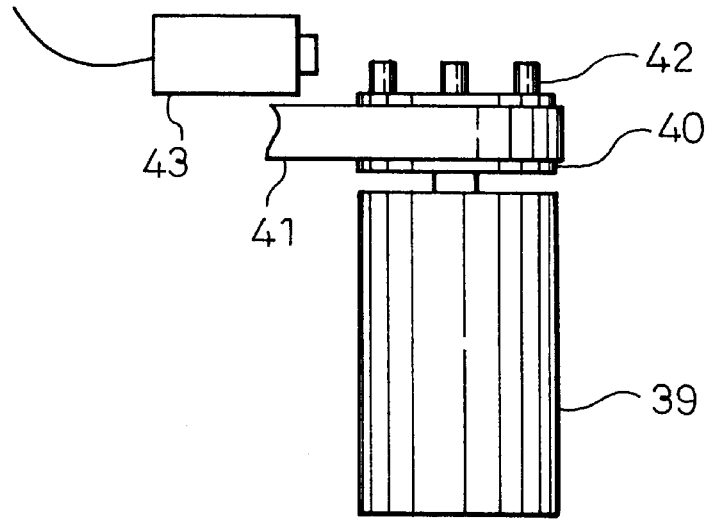

FIG. 11 is a view taken along a line XI—XI in FIG. 10 and shows an arrangement of a detector for detecting a traversing guide.

Figure 12:
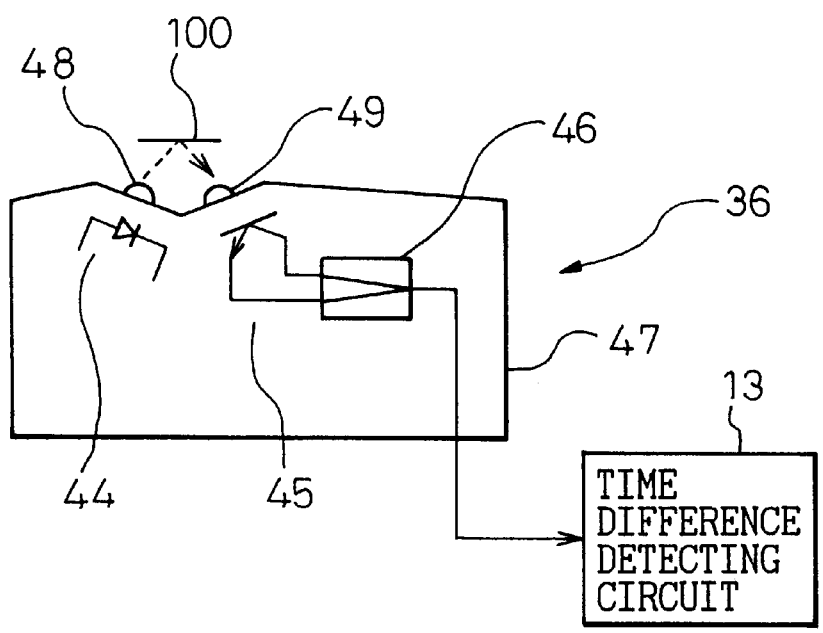

FIG. 12 shows a schematic arrangement of a detector for detecting a transverse wave in FIG. 8.

Figure 13:
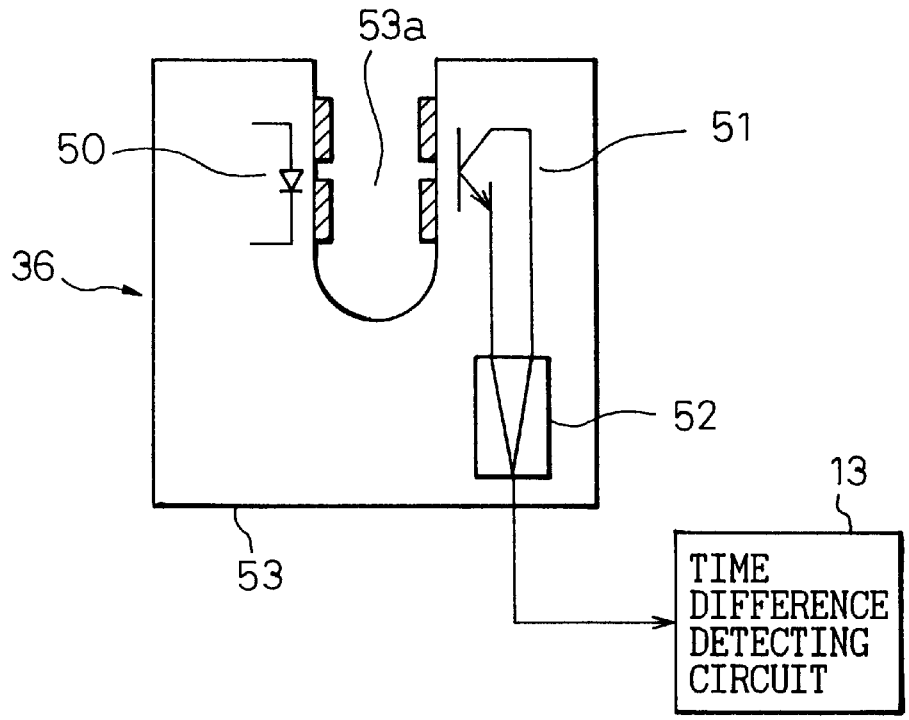

FIG. 13 shows a modification of a detector for detecting a transverse wave in FIG. 8.

Figure 14:
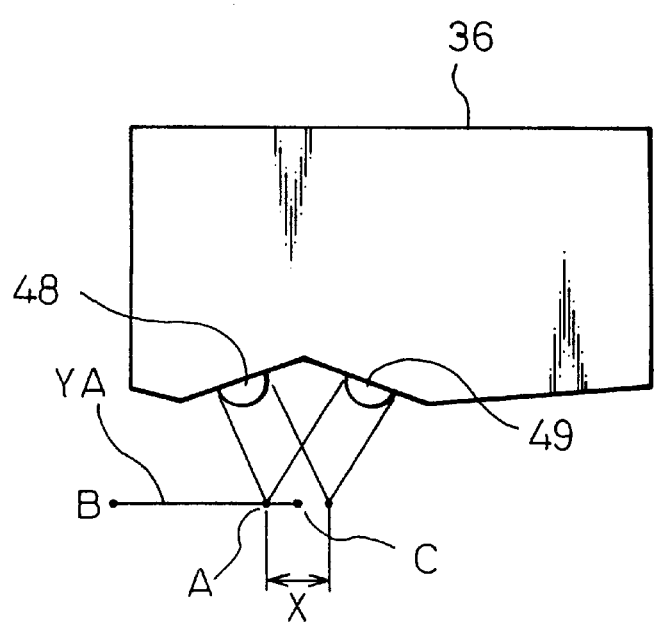

FIG. 14 shows a further modification of a detector for detecting a transverse wave in FIG. 8.

Figure 15:
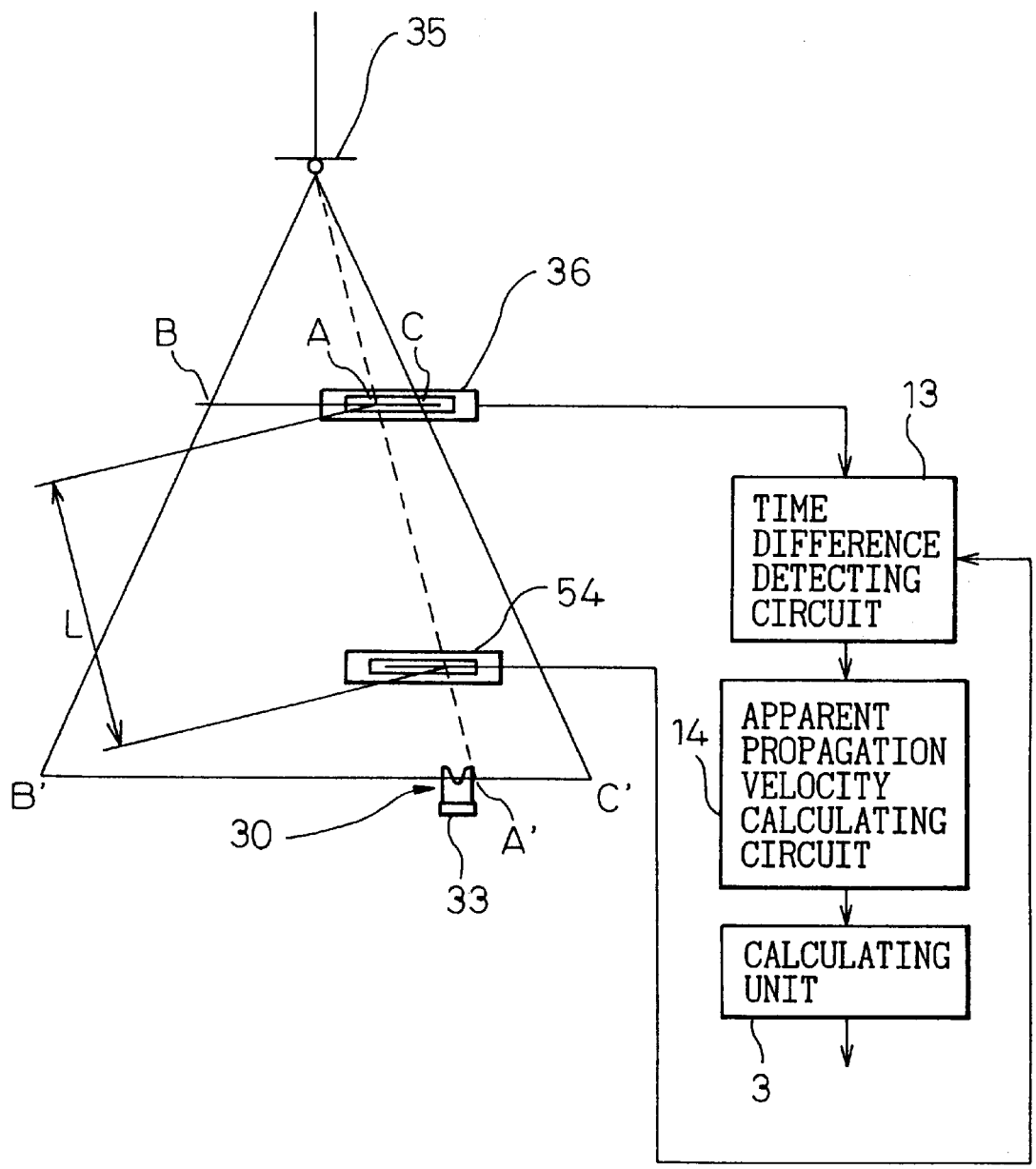

FIG. 15 is similar to FIG. 8 but illustrates a modified arrangement where a detector for detecting a vibration is spaced from a traversing guide.

Figure 16:
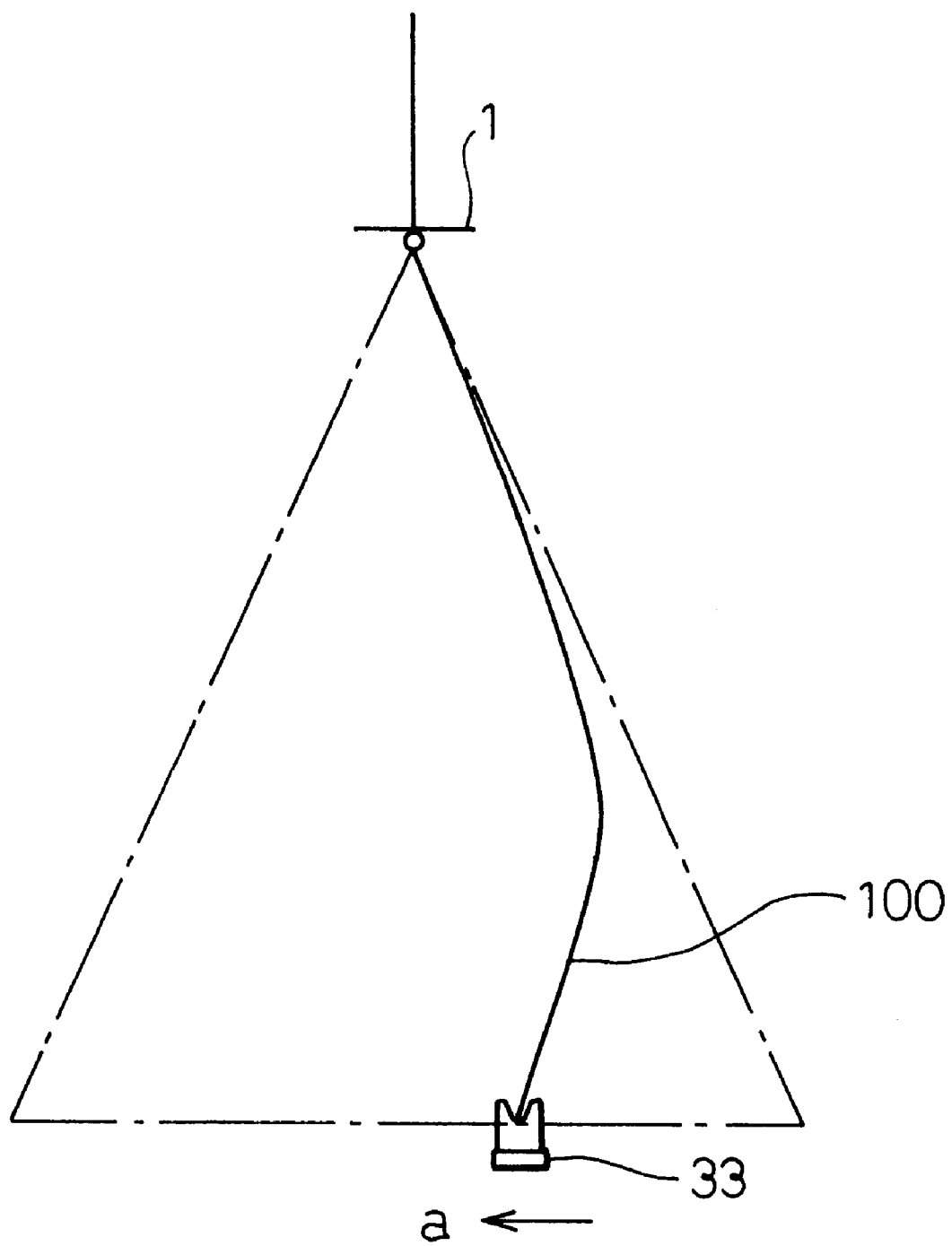

FIG. 16 shows a transmission of a transverse wave of a yarn as generated at a traversing guide.

Figure 17:
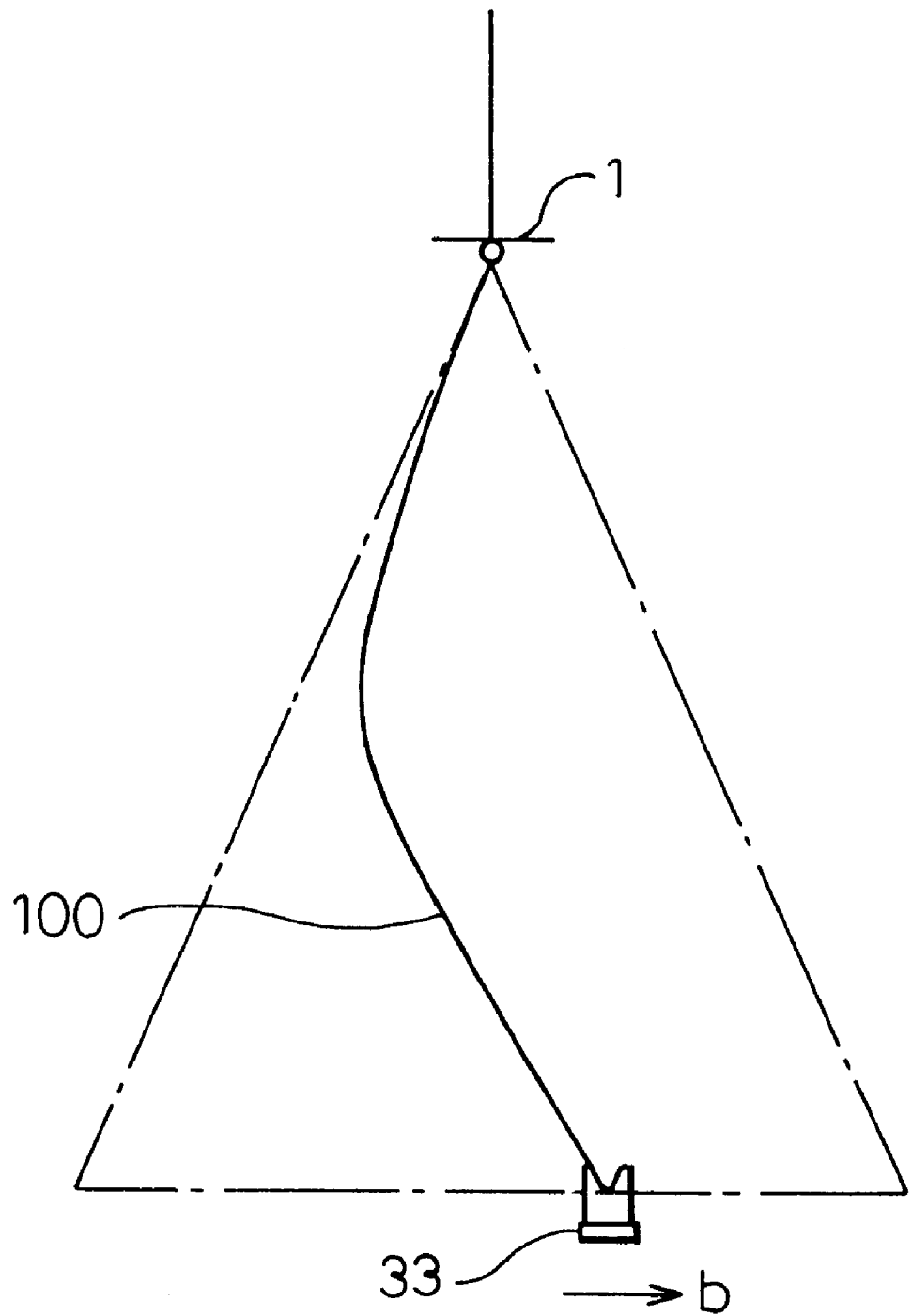

FIG. 17 is similar to FIG. 16 but shows a transmission of a transverse wave of a yarn when the direction of the traverse movement of the traverse guide is reversed.

Figure 18:
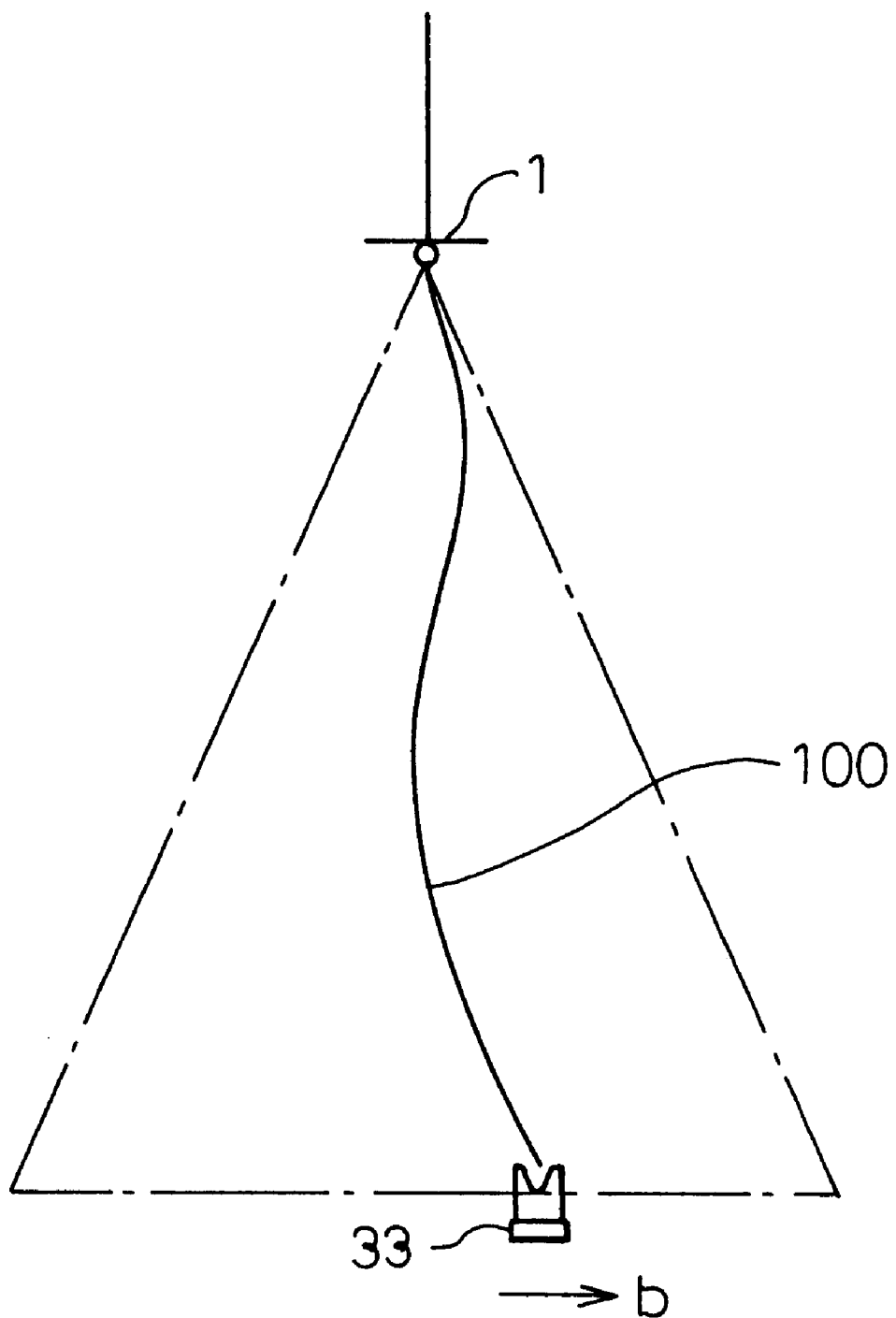

FIG. 18 shows a modified mode of a transmission of a transverse wave.

Figure 19:
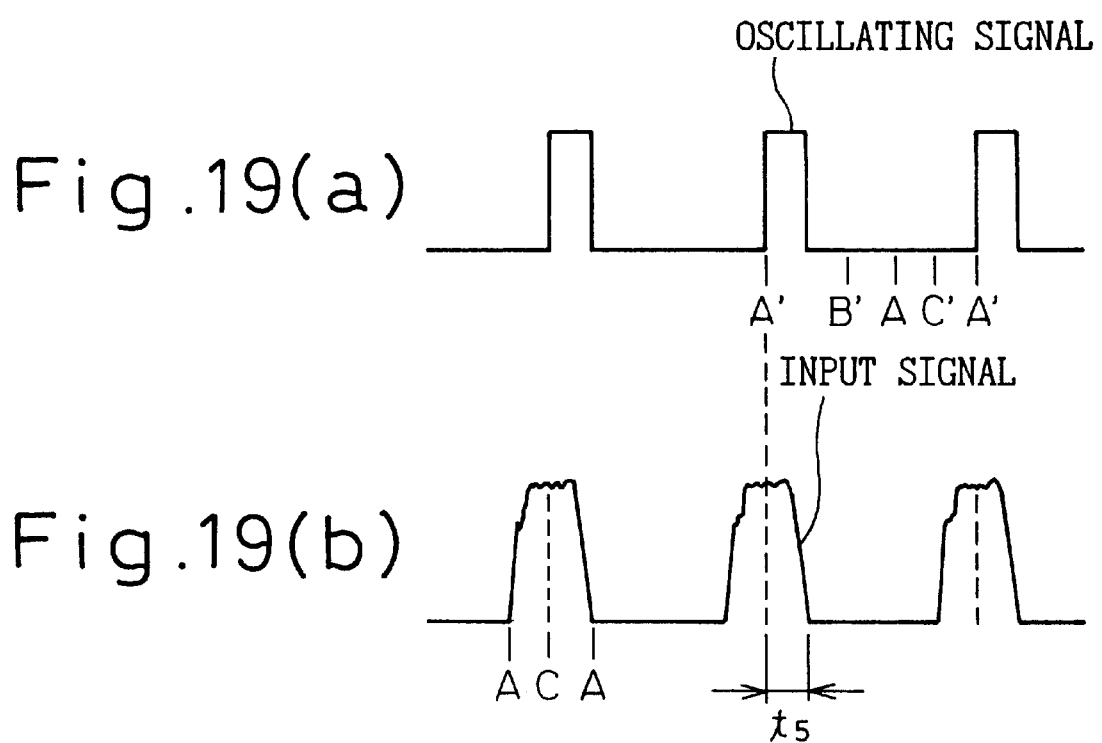

FIGS. 19(a) and (b) shows timing charts illustrating an oscillating signal and a received signal, respectively in the second embodiment in FIG. 8, where a propagation velocity of transverse wave as generated by a traversing mechanism is measured.

Figure 20:
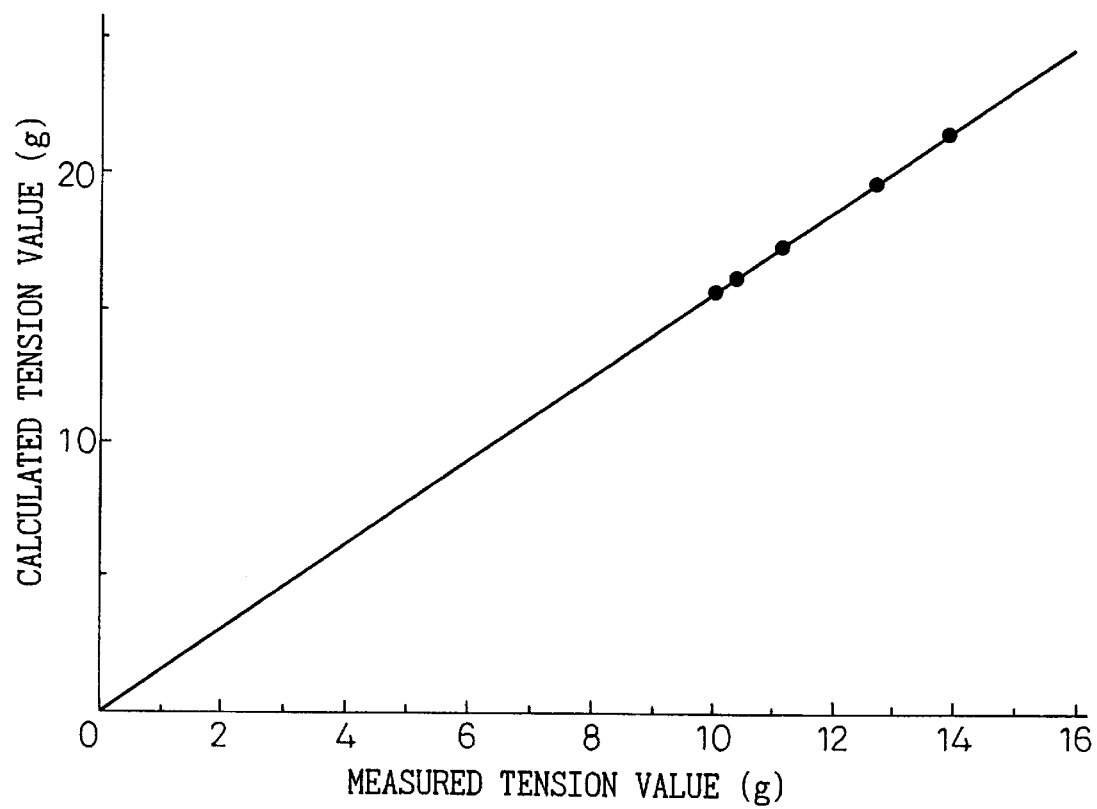

FIG. 20 is similar to FIG. 7 but shows a relationship between a detected tension and a calculated tension in the second embodiment in FIG. 8.

Figure 21:
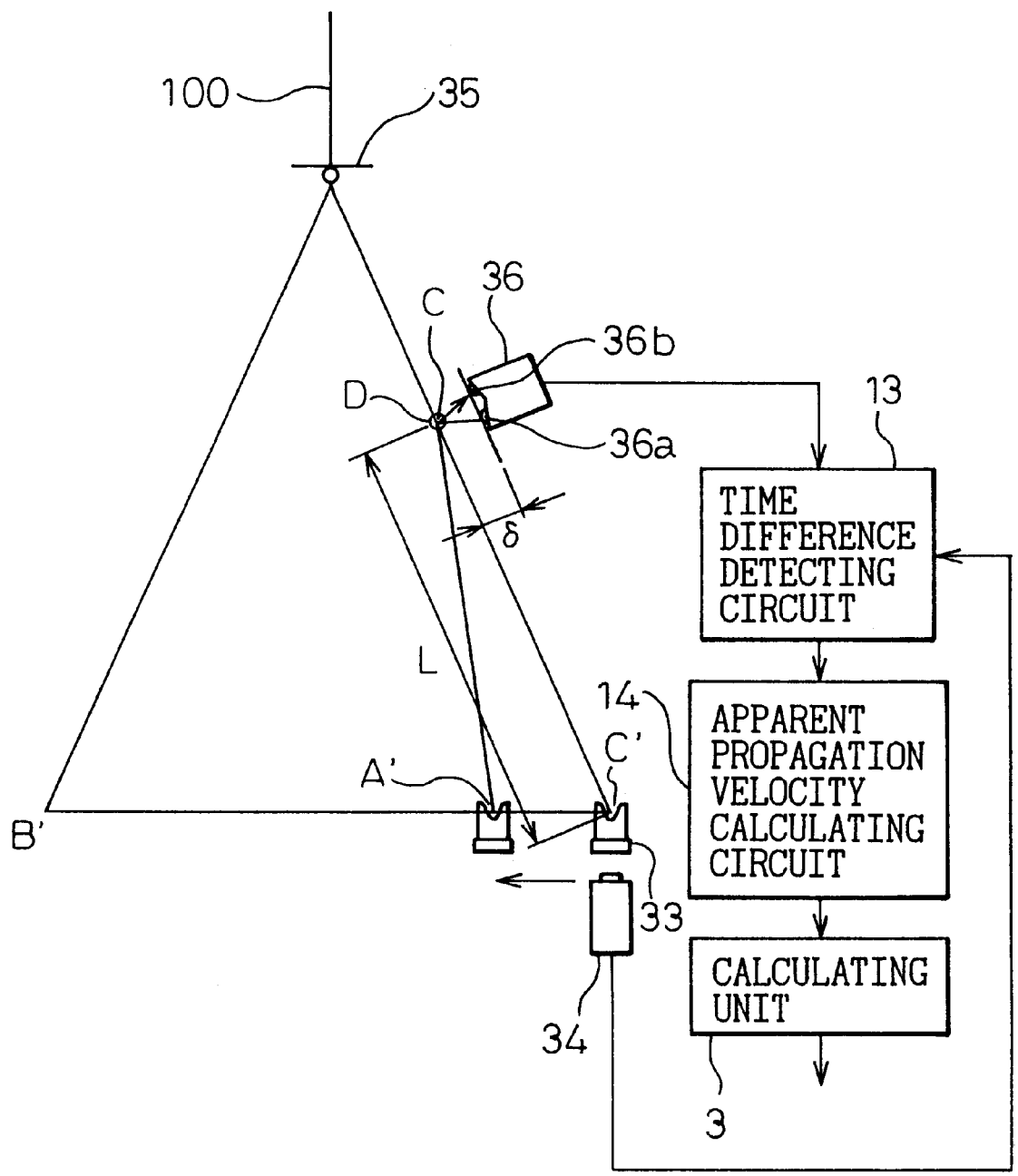

FIGS. 21 is similar to FIG. 8 but the arrangement of a detector for detecting a transverse wave in the yarn is modified so that the detector is arranged on one side of a yarn in plane of a traverse movement of the yarn.

Figure 22:
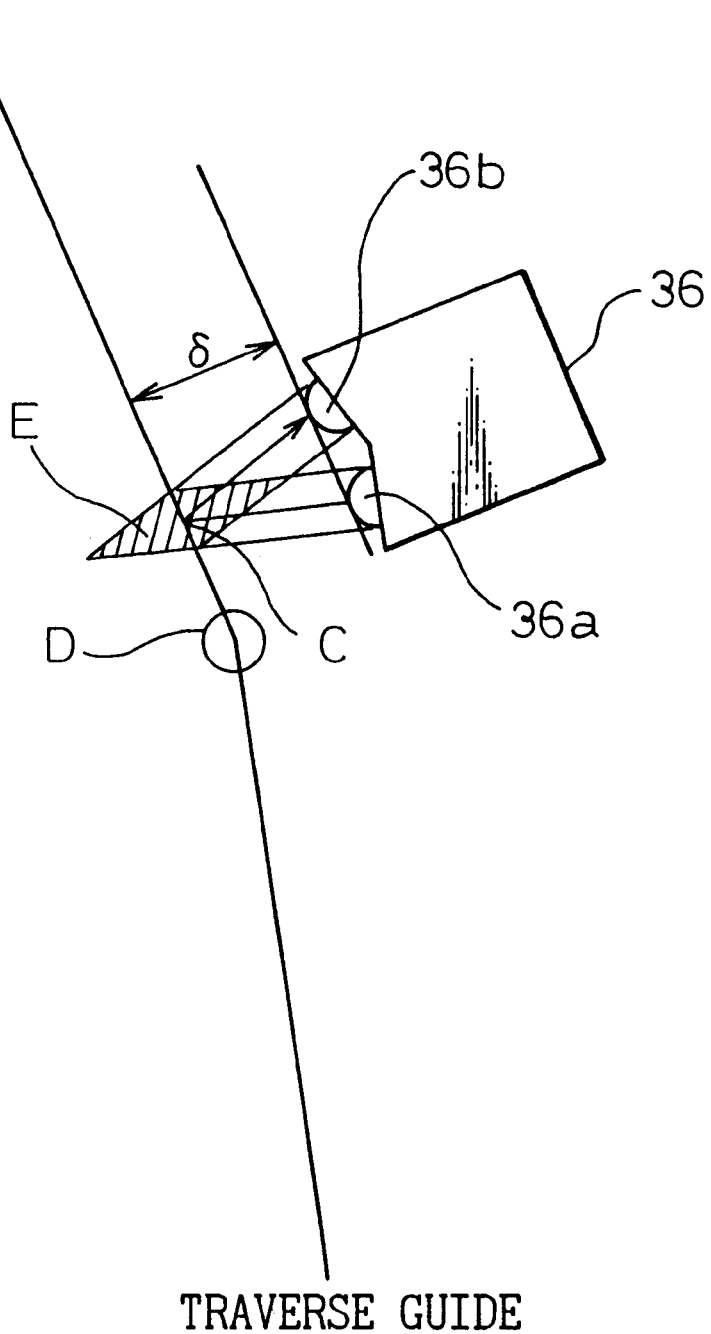

FIG. 22 illustrates how the detector is located with respect to the yarn in the system in FIG. 21.

Figure 23:
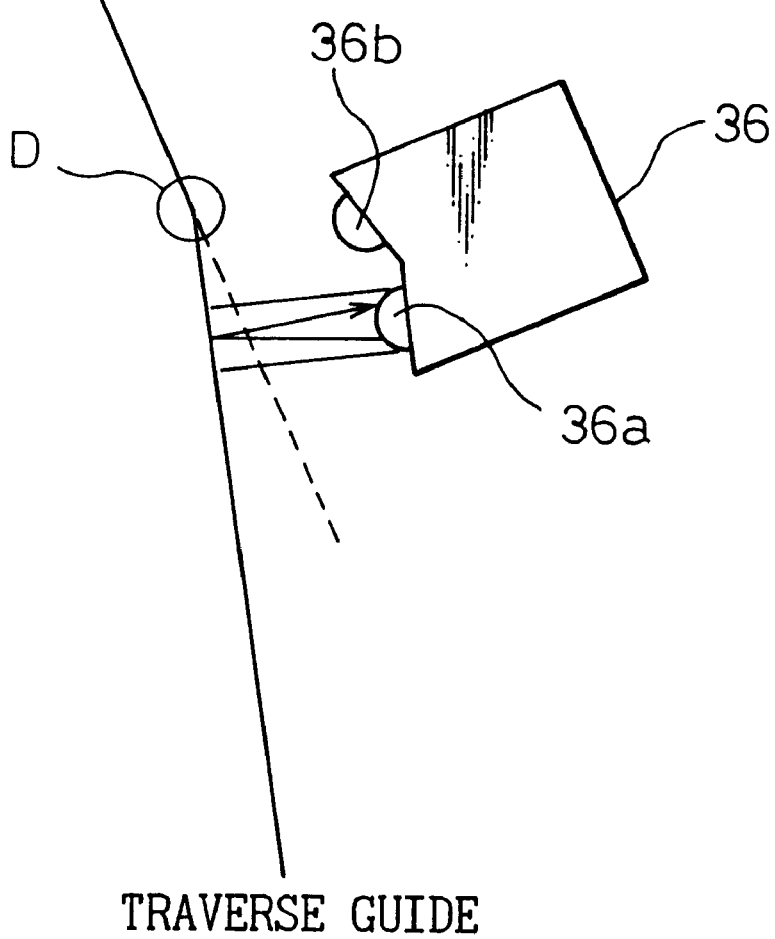

FIG. 23 is similar to FIG. 22 but illustrates a different position of a traversing wave with respect to the detector due to a different traversing position of the transverse guide.

FIGS. 24(a), (b) and (c) show changes in a received signal at the receiver, timing of the generation of a receiving signal and the timing of a generation of an oscillating signal, respectively, in the system in FIG. 21.

Figure 1:
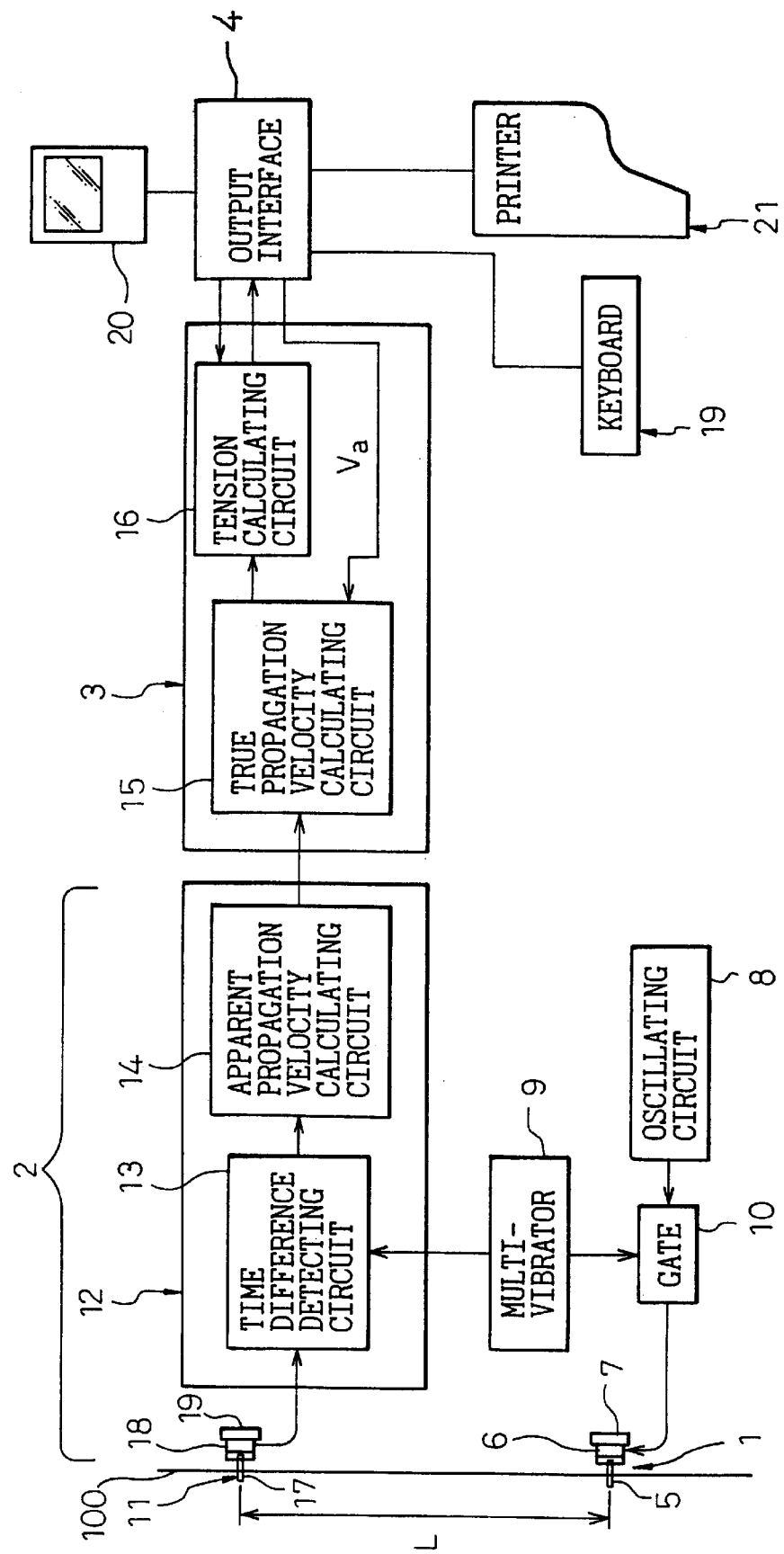
FIG. 1 is a schematic view of a system for measuring yarn tension from a propagation velocity of a transverse wave according to the first embodiment of the present invention.
Figure 25:
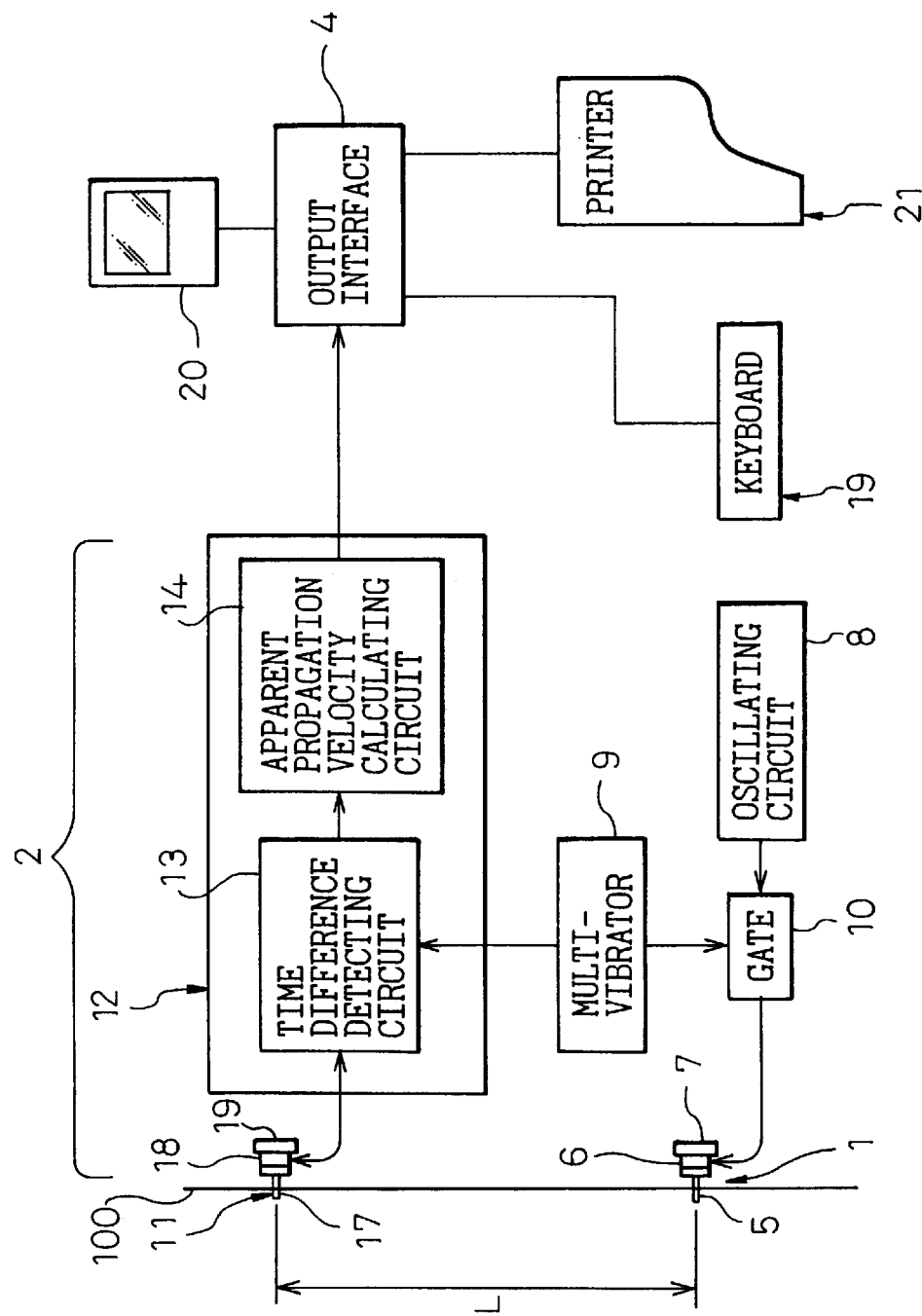

FIG. 25 is similar to FIG. 1 but illustrates an arrangement for measuring a propagation velocity of transverse wave where a vibration is applied to a yarn in a winding machine for controlling a shape of a package in a winding machine.

Figure 26:
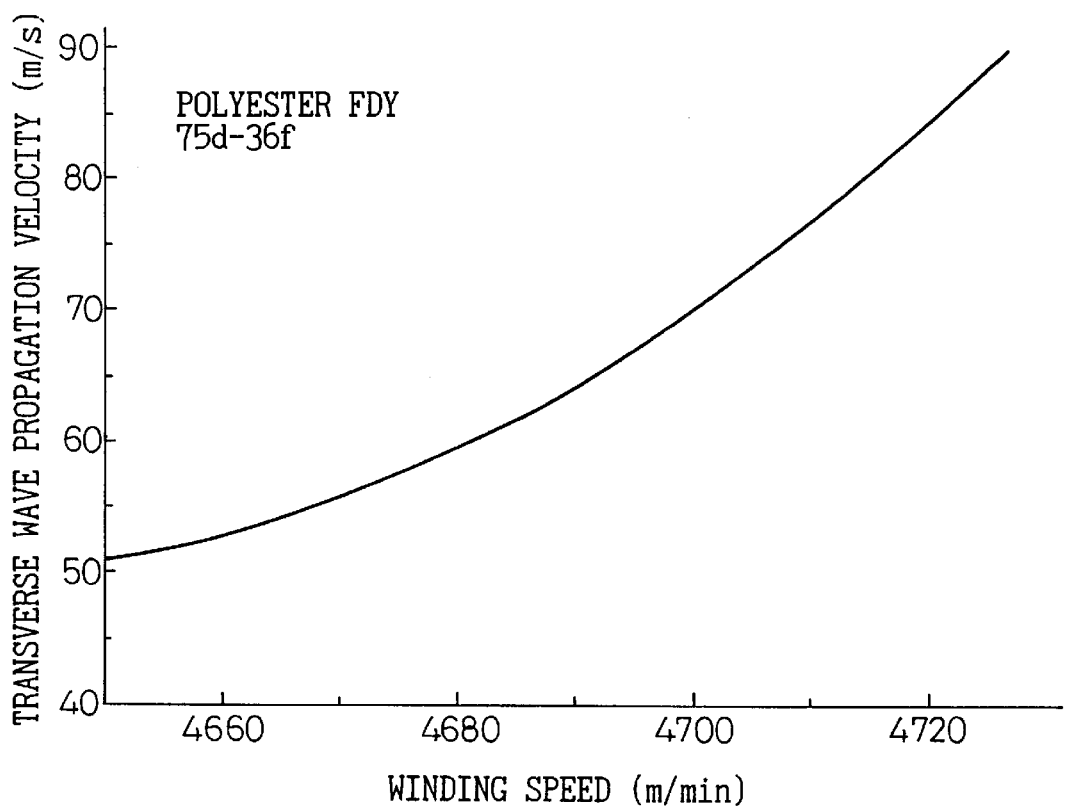

FIG. 26 is a relationship between a winding-up speed and a transverse wave propagation velocity during a winding process.

Figure 27:
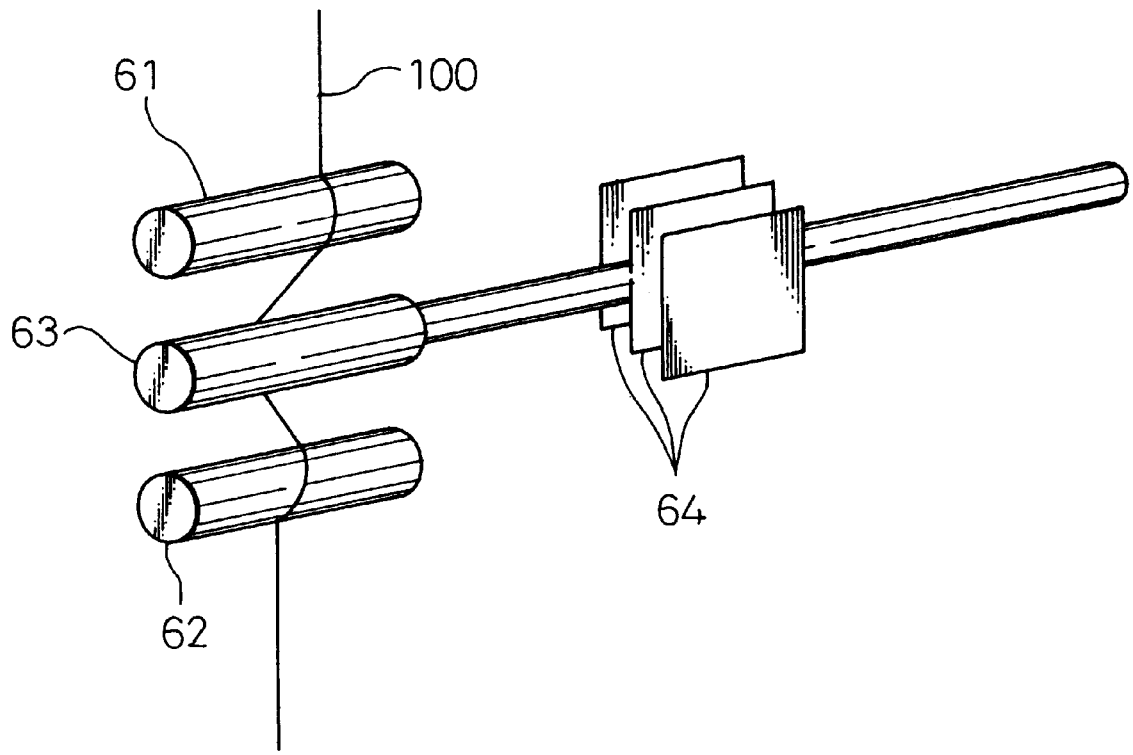

FIG. 27 is a schematic perspective view of a three point type tension measuring device.

DESCRIPTION OF PREFERRED EMBODIMENT

FIG. 1 shows generally a first embodiment of a system for measuring a yarn tension according to the present invention. The system is for measuring a tension of a yarn 100 which is moved along a yarn path, and is constructed by a vibration applying unit 1 for applying to the yarn a vibration, a measuring unit 2 for measuring an apparent propagation velocity of a transverse wave generated in the yarn, a calculating unit 3 for calculating the true propagation velocity of the transverse wave based on the measured apparent propagation velocity and a measured speed of the yarn, and an input/output interface 4 for issuing desired signals for allowing a viewer to see a calculated value of the tension and for allowing controllers to operate in a desired manner.

In the above, the transverse wave propagation velocity refers to a speed of a movement of a displacement of the yarn in a direction transverse to the direction of the movement of the yarn.

Figure 2:
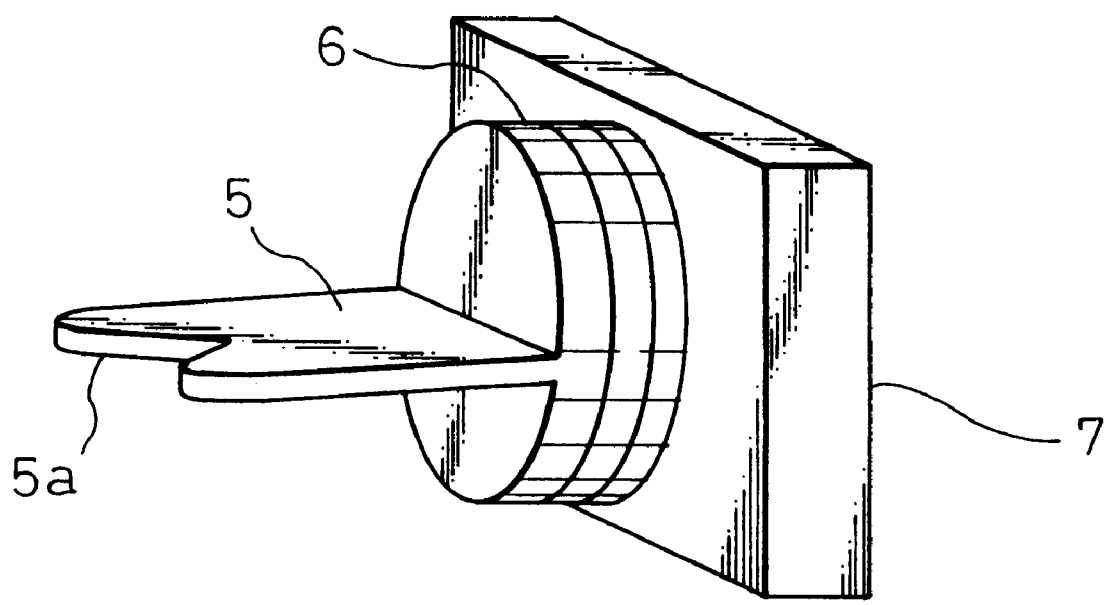
FIG. 2 is a perspective view of a vibrating applying unit using a piezoelectric element in FIG. 1.

As shown in FIG. 2, the vibration applying unit 1 is constructed by a bracket 7 fixedly connected to a frame (not shown) of a yarn treating machine such as a winder, a yarn guide 5 having an U-shaped groove 5a for the yarn and fixedly connected to the bracket 7 and a piezoelectric element 6 arranged between the yarn guide 5 and the bracket 7 for imparting a vibration to the yarn. The arrangement of the yarn guide 5 is such that the yarn subjected to a treatment such as a winding by the yarn treating machine is suitably located in the yarn path 100 in FIG. 1. As shown in FIG. 1, the vibration applying unit 1 is further provided with an oscillator circuit 8 for generating a vibrating wave signal, a gate 10 connected to the oscillator circuit 8 so that the signal from the oscillator circuit 8 is applied to the gate 10 and a multi-vibrator 9 connected to the gate 10 for feeding to the gate 10 a desired ON/OFF signal as a repetition of a high state signal of duration of time $t_1$ and a low state signal of a duration of time $t_2$ (FIG. 5a), so that the oscillating signal is applied to the piezoelectric element 8 at a predetermined interval.

The measuring unit 2 is constructed by a transverse wave detecting device 11 for detecting the transverse wave in the yarn 100 applied by the vibration applying unit 1 and a signal processing unit 12 for generating a signal indicative of the apparent transverse wave propagation velocity based on the time to detection, by the transverse wave detecting unit 11, of the transverse wave generated by the vibration applying unit 1.

The signal treating unit 12 is constructed by a time difference detecting circuit 13 for detecting a time difference based on the detecting signal of the transverse wave detecting unit 11 and the oscillating signal of the multi-vibrator 9, and a calculating circuit 14 for calculating an apparent propagation velocity of the transverse wave.

The calculating unit 3 is constructed by a speed calculating circuit 15 which calculates a true transverse wave propagation velocity from the apparent propagation velocity and the preset value of the yarn speed and a tension calculating circuit 16 which calculates a yarn tension from the thickness of the yarn and the true transverse wave transmitting speed.

The transverse wave detecting unit 11 has a construction similar to the vibration applying unit 1 and is constructed by a guide 17 having a U-shaped groove for guiding the yarn, a bracket 19 which is fixedly connected to the machine frame (not shown) so that the U-shaped groove is located in the yarn passageway and a piezoelectric element 18 for connecting the guide 17 with the bracket 19 so that a vibration is transmitted to the guide 17. The transverse wave detecting unit 11 is spaced from the vibration applying unit 1 at a predetermined distance L (m).

As shown in FIG. 1, connected to the input/output interface 4 are a key board 19 for inputting data such as a value of the thickness of the yarn and a yarn speed, a cathode ray tube 20 as a display and a printer for printing desired information.

Now, an operation of the above mentioned yarn tension measuring system for executing measurement of yarn tension will be explained.

Under a condition that the yarn 100 is moved or subjected to a winding operation, to the gate 10, an oscillating signal of a frequency in a range 30 to 40 KHz from the oscillator 8 as well as an ON/OFF signal as a repetition of a low signal of a duration of $t_1$ seconds and a high state signal of duration of $t_2$ seconds, which are in a range of 20 to $50 \times 10^{-3}$ sec are introduced. As a result, an oscillating signal modulated by the ON/OFF signal as shown in FIG. 5(b) is obtained. Namely, in the modulated signal, after a low state condition of duration of $t_1$ seconds, an oscillating signal of a duration of the time $t_2$ follows.

The ON/OFF signal from the multi-vibrator 9 as shown in FIG. 5(a) is also fed to the time difference detecting circuit 13 of the measuring unit 2.

The piezoelectric element 6 is operated by the oscillating signal from the gate 10, which causes the guide 5 to be subjected to a vibration under a cycle of $t_1+t_2$. As a result, the yarn 100 is also subjected to a vibration of the same cycle.

When the yarn 100 subjected to the vibration at the vibration applying unit 1 comes to the location of the transverse wave detecting unit 11 and the yarn 100 comes into contact with the guide 17, the piezoelectric element 18 is brought into an operation, i.e., the ON/OFF signal is received by the piezoelectric element 18. The received ON/OFF signal as shown in FIG. 6(a) is introduced into the time difference detecting circuit 13, whereat, as shown in FIG. 6(b), time differences $t_3$ (sec) and $t_4$ (sec) of the received ON/OFF signal with respect to the oscillating signal from the multi-vibrator 9 are calculated and are fed to the calculating circuit 14.

The relationship between the time differences $t_3$ and $t_4$ is such that $t_3<t_4$. Furthermore, the time difference $t_3$, which is a time difference between the leading edge of the received ON/OFF signal and the leading edge of the oscillating signal, corresponds to the transmitting time of a longitudinal wave in the yarn. The time difference $t_4$, which is a time difference between the trailing edge of the received ON/OFF signal and the trailing edge of the oscillating signal, corresponds to the transmitting time of a transverse wave as a function of the tension of the yarn. Thus, the measured value fed to the calculating circuit is the time difference $t_4$.

Then, at the calculating circuit 14, by using the transverse wave propagation velocity $t_4$ and the distance L (m) between the vibration applying unit 1 and the transverse wave detecting unit 11, the apparent transverse wave transmitting time $V_0$ (m/sec) is calculated by the following equation, $$V_0 = L/t_4 \qquad (1).$$

The calculated apparent transverse wave transmitting time $V_0$ (m/sec) is introduced into the unit 3. At the speed calculating circuit 15, by using the apparent transverse wave transmitting time $V_0$ and the yarn running speed Va, a true transverse wave transmitting speed V (m/sec) is calculated as follows. Namely, when the transverse wave detecting unit 10 is located upstream form the vibration applying means 1 in the direction of the movement of the yarn, the true transverse wave propagation velocity V is calculated by, $$V = L/t_4 + Va \qquad (2).$$

Contrary to this, when the transverse wave detecting unit 10 is located downstream from the vibration applying means 1 in the direction of the movement of the yarn, the true transverse wave propagation velocity V is calculated by, $$V = L/t_4 - Va \qquad (3).$$

In the above equations, the yarn running speed is the winding up speed of the yarn or the speed of the yarn at the location where the yarn is issued. In addition, when the winding up speed is used, the precision will be increased if an influence of the winding angle θ of the yarn during a traverse movement of the yarn is considered by calculating the yarn speed Va by the equation, $$Va = Vw \times (1/\cos \theta) \qquad (4),$$

where Vw is yarn winding-up speed. The calculated value of the yarn speed Va is introduced input into the circuit 15 from the keyboard 19. Alternately, a sensor is connected to the winding machine for obtaining a signal indicating winding speed which is introduced into the circuit 15.

The true transverse wave propagation velocity V calculated at the circuit 15 is fed to the yarn tension calculating circuit 16, where, based on the speed V and the weight of the yarn per unit length (lineal density ρ(Kg/m)), the yarn tension G (kgf) is calculated by the following equation, $$T = \rho \times V^2 / 9.807 \qquad (5).$$

In case where the transverse wave detecting units are arranged at both of the upstream and downstream locations, the yarn speed Va is calculated by $$Va=(L/t_4-L/t_4')/2 \qquad (6),$$

where $t_4'$ is the time difference calculated at the upstream side and $t_4'$ is the time difference calculated at the downstream side. In this modification, it is unnecessary for an operator to operate the keyboard to input data of the yarn speed va as is the case in the above embodiment.

It is needless to say that a modification is possible that the calculations at the above mentioned units 14, 15 and 16 are done by an integrated calculating unit.

Furthermore, the functions of these units 14, 15 and 16 can be provided by software in a computer.

Figure 3:
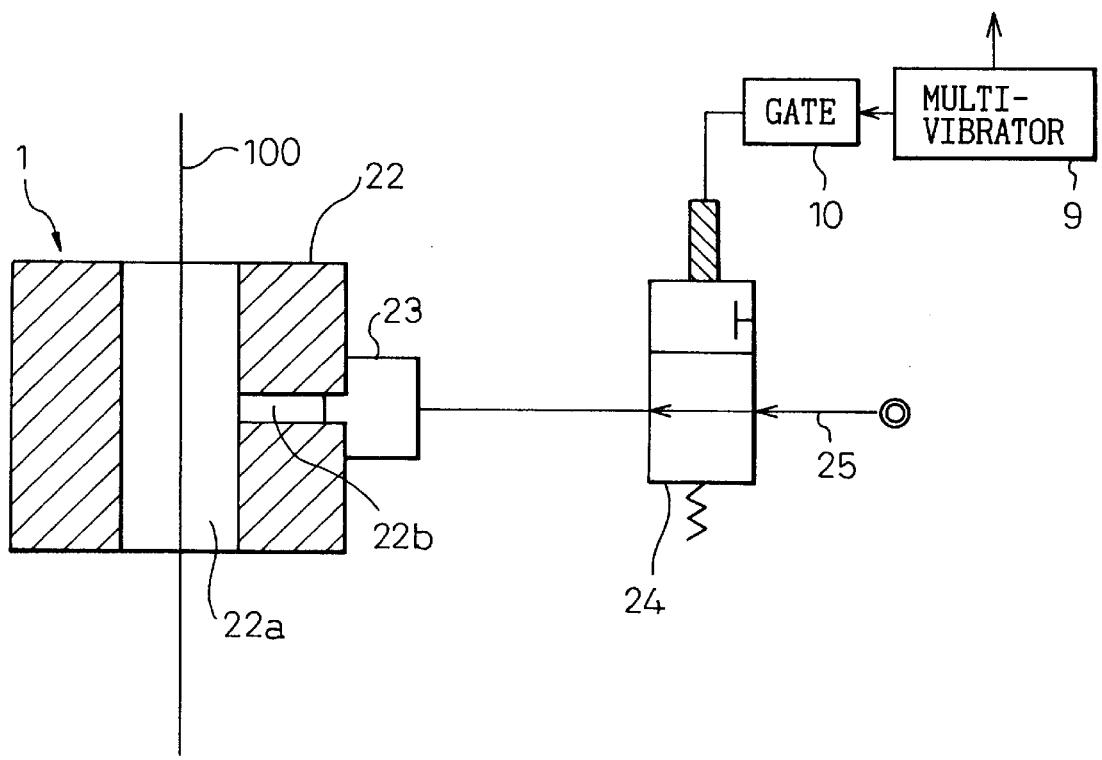
FIG. 3 is a schematic illustration of a modification of a vibrating applying unit using an injection of compressed air.

FIG. 3 shows a modification of a vibration applying unit 1, which includes a nozzle body 22 having a yarn passage 22a in which the yarn 100 moves, a nozzle hole 22b opened laterally to the yarn passage 22 so that a compressed air from the nozzle hole 22b is injected to the yarn passage 22a, an union 23 connected to the nozzle hole 22b, a pipe line 25 connected to the union 23, and a two position two port electromagnetic valve 24. The oscillating signal from the multi-vibrator 9 is, during an opened condition of the gate 10, transmitted to the electromagnetic valve 24, so that the latter is subjected to a vibrative operation, so that the compressed air from its source is injected from the nozzle hole 22b laterally, which causes the yarn 100 to be subjected to a vibration, thereby generating a transverse wave in the yarn 100. As similar to the first embodiment, a transverse wave detecting unit not shown in FIG. 3 but having the similar structure as that (11) in FIG. 1 detects the transverse wave transmitted from the vibration applying unit 1 and a time difference of the detection of the transverse wave from the application of the vibration to the yarn, which time difference is used to calculate the yarn tension.

Figure 4:
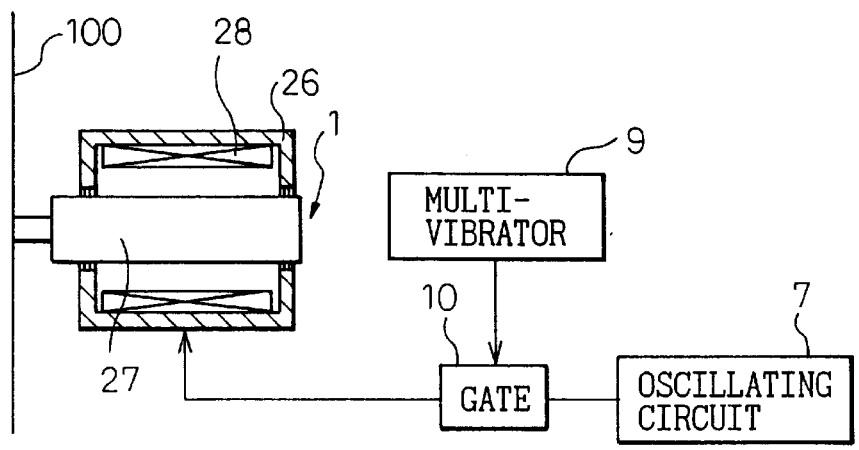
FIG. 4 is a schematic illustration of a further modification of a vibrating applying unit using an electromagnetic actuator FIGS. 5(a) and (b) are timing charts illustrating on-off signal by a multivibrator and an oscillating signal applied to a vibrator, respectively.

FIG. 4 shows another modification of a vibration applying unit 1, which includes a casing 26, a steel core 27 housed in the casing 26, and an electromagnetic coil 28 connected to the gate 10 operated by the multi-vibrator 9. The coil 27 has an end which is in contact with the yarn. Thus, during an opened condition of the gate 10 operated by the multi-vibrator, the oscillating signal from the oscillator 7 is applied to the electromagnetic coil 28, which causes the steel core 27 to be vibrated, so that the yarn 100 in contact with the steel core 27 is subjected to the vibration. In the similar way, a transverse wave detecting unit detects the transverse wave transmitted from the vibration applying unit 1 and a time difference of the detection of the transverse wave from the application of the vibration to the yarn, which time difference is used to calculate the yarn tension.

Result of Tests 1

Now, the results of tests of the detection of yarn tension using the device according to present invention will be explained. The test was done by winding a yarn onto a bobbin in a winding machine under the following conditions.

The yarn: Polyester multi filament yarn of thickness of 75 denier and of 36 filaments;

Delivery speed of yarn at a godet roller: 4800 meter/minutes

Frequency of oscillated signal from oscillator (8): 30 KHz;

Duration time of ON/OFF signal from multi-vibrator (9): 0.02 seconds;

Distance (L) between vibration applying unit (1) and transverse wave detecting unit (11): 0.1 meter, and;

Weight of yarn (lineal density ρ): 0.008 Kg/meter.

The values of the oscillating signal and ON/OFF signal are suitably determined by means of the vibration applying means.

Under the above conditions, the taking up speed of the yarn varied, and, at every value of the varied speed, the time difference in the transmission of the transverse wave were calculated and are shown in the following table I together with the value of yarn tension measured by a conventional contact type tension detecting device produced by ONLINE Co.

TABLE I

| Wind-up Speed Va (m/min) | Transverse Wave Transmission Time Difference $t_4$(m sec) | Calculated Tension value (DOT) gf | Measured tension value (DOT) gf |
|---|---|---|---|
| 4760 | 1.983 | 14.32 | 9.24 |
| 4765 | 1.953 | 14.51 | 9.37 |
| 4770 | 1.907 | 14.80 | 9.56 |
| 4775 | 1.840 | 15.25 | 9.84 |
| 4780 | 1.756 | 15.87 | 10.26 |

FIG. 7 shows a relationship between the measured tension and the calculated tension. As will be clear from FIG. 7, the relationship is a direct function passing through the origin (0, 0) of the coordinate. Although a difference exists between the values of the tension, this is not important since, depending on maker and type, the coefficient of the friction during a movement of the yarn is not the same, which usually causes the tension values not to be the same. In other words, in order to measure a yarn tension, the device according to the present invention can be used in place of a conventional contact type tension measurement device. Rather, the present invention is advantageous in that the precise measurement can be done since the friction, which may cause the precision of a measurement to be reduced, does not occur.

Now, a second embodiment of the present invention will be explained with reference to FIG. 8, which is directed to a measurement of a yarn tension during a formation of a yarn package on a winding machine in a system, such as a melt spinning system for a synthetic fiber making. Namely, in this embodiment, a yarn tension measuring apparatus includes a vibration applying unit constructed by a yarn traversing device of the yarn winding machine. In FIG. 8, the winding machine includes a traversing device 30, which is in well known manner located above a spindle (not shown) on which bobbins for taking-up the yarn are detachably mounted and a fulcrum guide 35 for the traverse movement of the yarn coming from a spinneret (not shown)- As shown in FIG. 9, the traversing device includes an electric motor 31, a scroll cam roller 32 connected to the electric motor 31 so that the scroll cam roller 32 is rotated and traverse guides 33 for causing the traverse guides 33 to be reciprocated along the axis of the roller 32. The yarn 100 is, at the traverse guide, subjected to a traverse movement of a width corresponding to the width of a yarn package.

Similar to the first embodiment, in the yarn tension detecting device, the photo-electric transducer 36 as the transverse wave detecting unit is connected to the time difference detecting circuit 13 for detecting the time difference from the application of a transverse wave by the traversing device 30 to the detection of the transverse wave by the transducer 36, a circuit 14, for calculating an apparent transverse wave propagation velocity based on the time difference detected by the circuit 13 and a calculating unit 3 for calculating the yarn tension from the apparent transverse wave propagation velocity and the yarn taking-up speed. As similar to the first embodiment, peripheral devices such as CRT and a printing device are connected to the unit 3 via a suitable interface circuit.

In short, in this embodiment, the traverse guide 33 and the detecting device 34 correspond to a vibration applying unit 1 in the first embodiment. Thus, the spacing between the two parts 33 and 34 is equal to the distance L (m).

As the sensor 34, a static capacity type sensor or a light-electric transducer type sensor can by used.

In place of detecting a position of the traverse guide 33 by means of the detector 34, a construction as shown in FIG. 9 can be employed. Namely, a plurality of spaced detecting pieces 37 of the same number as that of the traverse guide 33 are arranged along the periphery of a rotating shaft 31-1 of the electric motor 31 in such a manner that the detecting pieces 37 are located on the same phased locations with respect to the corresponding traverse guides 33 during a complete one cycle of the reciprocating movement of the traverse device 30. Furthermore, a photo-electric sensor 34 is arranged to face a trajectory of the rotating movement of the detecting elements 37. This arrangement is desirable in a reduced production cost.

In the above embodiment, the use of the photo-electric type detectors 34 and 36 can, in order to detect yarn tension, eliminate any use of a guide which makes contact with the yarn. This construction is advantageous in that the yarn is prevented from being damaged, which would be otherwise generated in the prior art (FIG. 27) by contacting the guide with the yarn.

FIGS. 10 and 11 show a modification of a traversing device 30 which is itself known and which comprises a plurality of rotating blade units 38, a drive motor 39 having a drive shaft 39-1, a pulley 40 fixed to the shaft 39-1 and a belt 41. Each unit 38 has a first rotor assembly 38a having three blades 38a-1 and a second rotor assembly 38b having two blades 38b-1, a drive electric motor 39 . The unit 38 includes a rotating shaft 38-1 which causes the first and second rotor assemblies 38a and 38b to be subjected to rotating movements in opposite directions. Thus, during the rotating movement of the shaft 38-1, the blade 38a-1 engaging a yarn effects a traverse movement of the yarn in one direction, while the blade 38b-1 effects a traverse movement of the yarn in the opposite direction. As shown in FIG. 10, connected to the rotating shafts 38-1 are pulleys 38-2, which are looped by a belt 41 engaging the pulley 40 on the drive shaft 39-1 of the motor 39.

The pulley 40 is, along the periphery thereof, provided with detecting pieces 42 at respective locations corresponding to the desired phase in the reciprocating movement of the respective traversing units 38a. A detector 43 for detecting a time of an application of a vibration to the yarn is arranged at a location of the trajectory of the detecting pieces 42. See FIG. 11.

FIG. 12 shows a detailed construction of the photo-electric sensor 36 as the transverse wave detecting unit. Namely, the sensor 36 includes a light emitter 44 having a lens 48, a light receiver 45 having a lens 49, an electric amplifier 46 in connection with the light receiver 45 and a casing 47. In more detail, the light emitter 44 and the light receiver 45 are connected to the casing 47 so that they (44 and 45) are arranged at a desired angle with respect to the yarn path 100. The sensor 36 is a reflective type where the light emitted from the emitter 44 is, after being subject to reflection by the yarn 100 in the yarn path, received by the receiver 45, so that an electric signal is, after the amplification at the amplifier 46, generated in the signal treating unit 12 for generating a signal indicative of the apparent transverse wave propagation velocity in the yarn.

FIG. 13 shows a modified structure of the photo-electric sensor 36, which includes a light emitter 50, a light receiver 51, an electric amplifier 52 and a casing 53. The casing 53 is formed with a yarn passage 53a of U-cross sectional shape. In more detail, the light emitter 50 and the light receiver 51 are connected to the casing 53 so that they are opposite each other via the yarn path. This modification of the sensor 36 is a light transmission type, where the light from the emitter 50 is received by the light receiver 51 through the yarn moved in the yarn passage 53a.

In the operation of the second embodiment directed to the application to the traversing operation as a unit for applying a transverse wave to the yarn, the detector 34 in FIG. 8 detects the traverse guide 33 during a forward stroke movement from a right end point C' to a left end point B' and generates a signal indicating a timing of a generation of a traverse wave to the yarn 100. The detector 34 is so constructed that a signal is not generated by the guide 33 during the rearward stroke movement of the guide 33 from the left end point B' to the right end point C'.

Furthermore, in FIG. 14, a line YA indicates a trajectory of the yarn subjected to a traverse movement in the horizontal plane including the sensor 36. Namely, in FIG. 8, the traverse movement of the traverse guide between the position C' and the position B' causes a transverse wave to be generated, which is transmitted upwardly, and, at the detector 36, causes the yarn to be traversed between a position $\underline{C}$ and a position $\underline{B}$ as shown in FIG. 14, The sensor 36 detects the yarn when the latter is located in a detecting area X, of the trajectory YA, which includes the portion of the trajectory of the yarn between $\underline{C}$ and $\underline{A}$. Furthermore, the construction of the sensor 36 is such that the light emitter 48 illuminates the detecting area X and the light receiver 49 receives light reflected from the yarn when the yarn is in the detecting area X.

FIG. 16 illustrates a transmission of a transverse wave generated in the yarn 100 when the traverse guide 33 is moved in the direction as shown by an arrow $\underline{a}$. FIG. 17 illustrates a transmission of a traverse wave when the traverse guide 33 is moved in the opposite direction as shown by an arrow $\underline{b}$. FIG. 18 shows a different mode of a transmission of the transverse wave in the yarn when the traverse guide is moved in the direction of the arrow $\underline{b}$.

FIG. 19(a) illustrates an oscillating signal from the sensor 34 faced with the traverse guide 33. Namely, the oscillating signal is generated when the traverse guide 33 is located on the point A' during a movement in the left-handed direction (from the point C' to B') in FIG. 8. Contrary to this, the oscillating signal is not generated at the point A' when the traverse guide 33 is moved in the right-handed direction (from the point B' to C') in FIG. 8.

FIG. 19(b) shows a transverse wave detecting signal detected by the sensor 36. As will be seen by FIG. 16, during the movement of the traverse guide 33 in the right handed direction, the sensor 36 detects the yarn at the position $\underline{A}$, i.e., issues a high state signal. This high state condition of the sensor 36 is maintained at the point C, where the direction of the movement of the yarn is reversed. During the movement of the yarn in the left handed direction, the movement of the yarn is delayed with respect to the movement of the yarn guide 33 as shown in FIG. 16. Thus, with respect to the timing of the arrival of the traverse guide 33 to the location A', the arrival of the yarn to the location A in the trajectory of the yarn at the level of the sensor 36 is delayed. Thus, a time difference $T_5$ exits between the time of the arrival of the guide 33 to the point A' and the time of the arrival of the yarn (transverse wave) to the point A. In other words, the time difference $T_5$ is considered as a time which is needed for transmitting the transverse wave as generated at the traverse guide 33 to the location therefrom at a distance L. Thus, in the similar way as that in the first embodiment, the calculating unit 3 calculates the yarn tension, which is output to the CRT and a printing device.

In place of arranging the detector 34 in the trajectory of the traversing movement of the traverse guide 33 of the traversing device 30 for detecting a desired phase position of the guide 33 of the as shown in FIG. 8, a sensor 54 as a vibration signal generator is arranged at a location vertically above the trajectory of the traverse movement of the traverse guide 33 at a distance L from the sensor 36 as the traverse wave detector as shown in FIG. 15. Based on signals from the sensors 54 and 36, a calculation of an apparent transverse wave propagation velocity is executed in the similar manner. This modification is advantageous in that an existing traverse device can be used without changing its construction.

Result of Tests 2

As similar to the first test in the first embodiment, a further test was done with regard to the second embodiment in FIG. 8 by winding a yarn onto a bobbin in a winding machine under the following conditions.

The yarn: Polyester multi filament yarn of thickness of 75 denier and of 36 filaments;

Delivery speed of yarn at a godet roller for delivery of yarn: 4800 meter/minutes, and;

Distance (L) between detectors 34 and 36: 0.39 meter.

Under the above conditions, the taking up speed of the yarn varied, and, at every value of the varied speed, the time difference in the transmission of the transverse wave are the calculated tension value are shown in the following table together with the value of yarn tension measured by a conventional contact type tension detecting device produced by ONLINE Co.

TABLE II

| Wind-up Speed Va (m/min) | Transverse Wave Transmission Time Difference $t_5$(m sec) | Calculated Tension value (DOT) gf | Measured tension value (DOT) gf |
| --- | --- | --- | --- |
| 4760 | 6.75 | 15.64 | 10.10 |
| 4781 | 6.51 | 16.18 | 10.45 |
| 4792 | 6.05 | 17.32 | 11.23 |
| 4705 | 5.31 | 19.63 | 12.79 |
| 4715 | 4.93 | 21.27 | 13.98 |

FIG. 20 shows a relationship between the measured tension and the calculated tension in the second embodiment. As is clear from FIG. 20 and the above table II in comparison with the table I and FIG. 7 with reference to the first embodiment, the similar result is obtained by the second embodiment. Thus, it can be concluded that in place of the contact type system for detecting yarn tension in the first embodiment, the device in the second embodiment can be used to obtain the similar result.

FIG. 21 shows a third embodiment of a system for measuring a yarn tension, wherein, similar to the second embodiment, the system is constructed by a yarn traverse guide 33 of a winder as a vibration applying means, a detector 34 for detecting an arrival of the guide to a front end C' in a stroke of traverse movement, a photo-electric reflective type sensor 36 located at a position between the traverse guide 33 and the traversing movement fulcrum guide 35 as a transverse wave detector, a time difference calculating circuit 13 for calculating a time difference 35 between an application of a vibration to the yarn 100 and the detection of the transverse wave, based on signals from the detectors 34 and 36, a circuit 14 for calculating an apparent transverse wave propagation velocity based on the time difference, and a calculating circuit 3 for calculating a true transverse wave propagation velocity based on the apparent propagation velocity and a yarn speed and calculating a yarn tension based on the true yarn propagation velocity. An interface circuit connected to a CRT and a printing device are also provided, similar to the first embodiment.

The arrangement of the reflective type photo-electric detector 36 is such that a light is illuminated to the yarn 100 from a location outside the yarn in a plane defined by the traversing yarn between traversing guide 33 moved along a trajectory C'-B', and the fulcrum 35. In other words, illumination of the light is done in a plane which is parallel to the yarn traversing plane. It is shown that the reflection type detector 36 is constructed by a light emitter 36a and a light receiver 36b. In addition, the detector 36 is provided with an amplifier and a comparator circuit as similar to the first embodiment.

During the winding of the yarn, the movement of the traversing guide 33 is, generally, done at a uniform speed. However, at the region around the end point B' of the traverse movement, the traverse guide 33 is subjected to a rapid speed reduction until the arrival of the guide to the end point B', and, after subjected to a reverse movement at the end point B', the guide 33 is accelerated to the uniform speed. Due to such a rapid reverse movement of the guide 33, the transmission of the transverse wave as generated at the guide 33 toward the fulcrum guide 35 is done such that a bent portion of the yarn D of a reduced radius of curvature, generated at the guide 33 when reversed from the forward stroke movement B'-C' to the rearward stroke movement C'-B', is moved upwardly toward the fulcrum guide 35.

The arrangement of the light emitter 36a and the light receiver 36b of the detector 36 is such that, when the light from the light emitter 36a illuminates an upper portion of the yarn upstream between the bent portion D and the fulcrum guide as shown in FIG. 22, an amount of the light reflected by the yarn and received by the light receiver 36b is increased due to the fact that the receiver 36b is located on the reflecting light path from the light emitter 36a, and that, when the light from the light emitter 36a illuminates a lower portion of the yarn between the bent portion D and the traverse guide as shown in FIG. 23, an amount of the light reflected by the yarn and received by the light receiver 36b is reduced due to the fact that the light receiver 36b is located outside from the reflection light path from the light emitter 36a.

In the above arrangement, the distance δ between the bent portion D and the sensor 36 may be varied in an area E of the detecting light path from the emitter 36a to the receiver 36b. However, the level of the light received by the receiver 36b after the passage of the bent portion D is always reduced over the level of the light received by the receiver 36b prior to the passage of the bent portion D. Thus, by detecting such a reduction in the light level, it is possible to know an exact timing of the passage of the bent portion D of the yarn.

Figure 24:
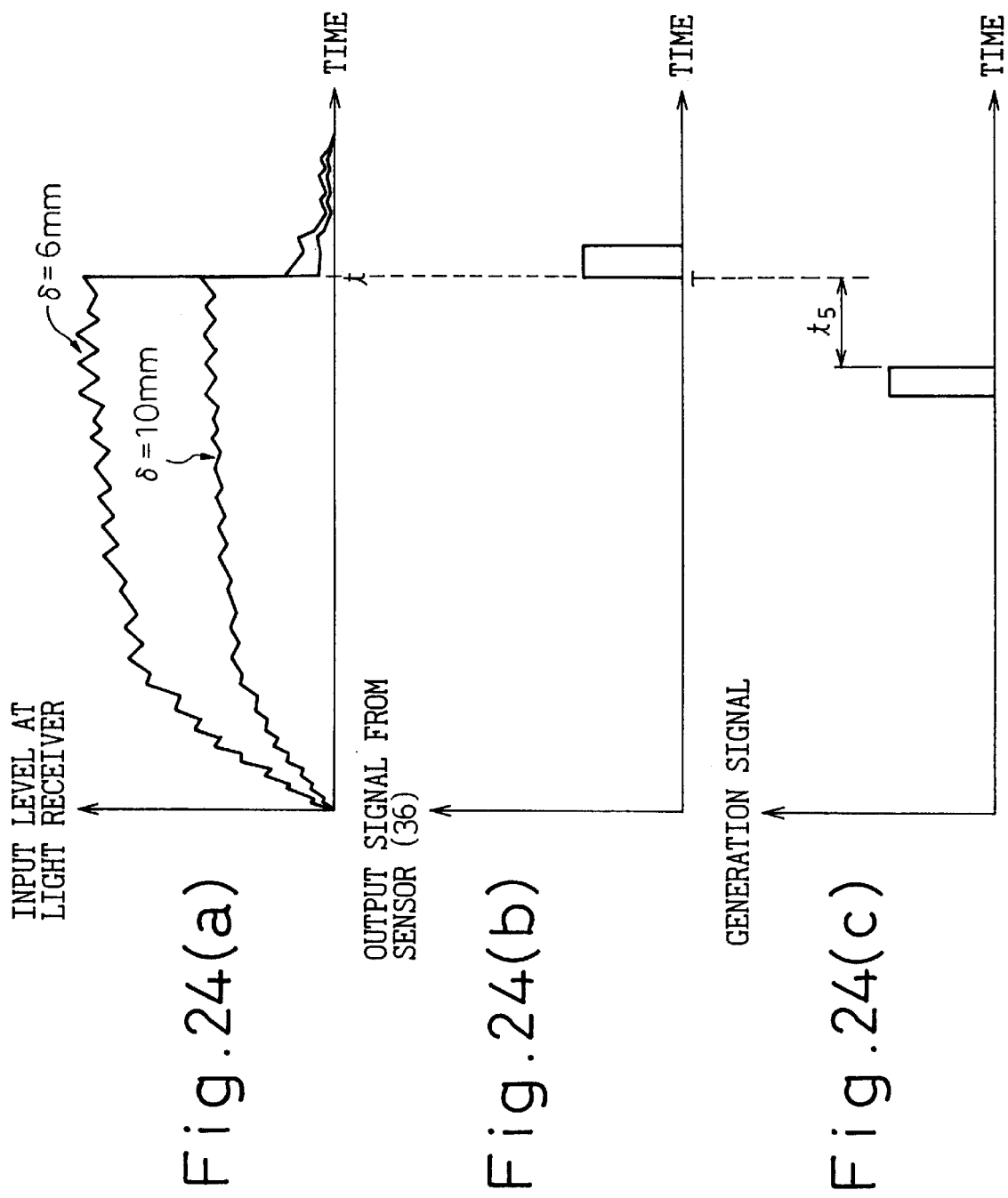

In FIG. 24(a), an upper curve shows a change in a level of the light received by the receiver 36b with respect to the lapse of time when the distance δ between the bent portion D and the sensor 36 is equal to 6 mm and a lower curve shows a similar change in a level of the light when the distance δ is equal to 10 mm. In both curves, a sharp drop of the detected light level is obtained at the same timing t, where a detecting signal (traverse wave detecting signal) is issued from the detector as shown in FIG. 24(*b*). Prior to the generation of the traverse wave detecting signal, the detector 34 (FIG. 21) faced with the traverse guide issues an oscillating signal as shown in FIG. 24(*c*). As similar to the second embodiment, a time difference $t_5$ from the generation of the oscillation signal and the detection signal is calculated, and the apparent transverse wave propagation velocity $V_0$ (m/sec) is calculated by the following equation, $$V_0 = L/t_5 \qquad (7)$$

According to this structure, even if the distance between the reflective photo-electric sensor 36 and the yarn path varies, the value of the apparent transverse wave propagation velocity $V_0$ can be precisely known, which is the advantageous point over the first and second embodiments, where the detecting light is issued transversely to the plane of the movement of the yarn path. Furthermore, in the case of the yarn traversing device as shown in FIG. 10, where the yarn is subjected to a guiding action by means of the rotary blades 38*a* and 38*b* having the guiding blades extending transverse to the direction of the traverse movement, a situation may arise that the yarn path measured by the reflective type photo-electric detector 36 is moved in the direction transverse to the direction of the traverse movement due to a variation in the tension. Even in such a situation, a provision of a plurality of the detectors 36*a* or 36*b* or both allows the detecting area to be widened in the lateral direction with respect to the direction of the transverse movement, which allows the bent portion D of the yarn to be detected in a reliable manner.

Now, a fourth embodiment of the present invention, which is directed to a method for winding a yarn for obtaining a package of a desired shape based on the information as to a transverse wave propagation velocity related to a yarn tension will be described. Namely, as will be understood from the following, the transverse wave propagation velocity as indicative of a yarn tension is closely related to a condition of the finished package. In other words, a transverse wave propagation velocity kept within a desired ratio can obtain a desirable winding condition, i.e., a desired shape of the finished package.

In the fourth embodiment, winding of the yarn is done using a winder which is basically the same as that explained with reference to FIGS. 8 to 12 in the second embodiment. Referring again to FIG. 8, a yarn from a nozzle (not show) is, via a transverse fulcrum guide 35 directed to a traversing guide 33, where the yarn is subjected to a traverse movement and is wound onto a bobbin (not shown) on a spindle (not shown), so that a package of the yarn is formed on the bobbin. The traverse guide functions as a vibration applying unit so that an oscillating signal is generated. The construction of the traversing device 30 is the same as that in the second embodiment which is explained with reference to FIG. 9 or 10. The sensor 34 is arranged to face the traverse guide 33 which generates an oscillating signal. The photo-electric sensor 36 arranged at a distance of L from the sensor 34 detects the yarn in the traverse movement, i.e., transverse wave generated in the yarn.

In this embodiment, a modified arrangement of the sensor 36 as explained with reference to FIG. 13 or 14 in the second embodiment may also be possible. Similarly, in this embodiment, a modified arrangement of the sensor 54 as explained with reference to FIG. 15 in the second embodiment may also be possible. Finally, in this embodiment, an arrangement of the sensor 36 in the yarn traversing plane as explained with reference to FIGS. 21 to 25 in the third embodiment may also be possible.

The processing circuit is similar to that in the second embodiment in FIG. 8. Namely, the time difference detecting circuit, corresponding to the unit 13 in FIG. 8 detects (calculates) a time difference $t_5$ between the timing of generation of the oscillating signal from, the sensor 34 or 54 (FIG. 15) and the timing of the arrival of the transverse wave by the sensor 36. The transverse wave propagation velocity detecting circuit corresponding to the unit 14 in FIG. 8 calculates a propagation velocity V of the transverse wave by $V = L/t_5$.

Now, as to the fourth embodiment, the result of a test of a wound condition of a finished package with respect to a change in a winding condition will be explained. This has been done with various types of yarn, including; a POY polyester yarn of thickness of 120d with 36 filaments; a POY polyester yarn of thickness of 240d with 48 filaments; a FDY polyester yarn of thickness of 75d with 36 filaments, which is obtained by a direct hot drawing from a melt spinning type; a HOY polyester yarn of thickness of 75d with 36 filaments which is obtained by a direct winding at a speed higher than 6,000 m/min, and; a nylon industrial type yarn of a thickness of 1,500d. the test is done by detecting the yarn tension based on the time difference between the timing of the generation of the oscillation signal by the traverse guide and the timing of the receipt of the transverse wave as explained above. A evaluation of the wound condition of finished packages was also done. The following table III shows a result of the test.

TABLE III

| | Yarn Type | | | | |
|---|---|---|---|---|---|
| | Polyester POY | Polyester POY | Polyester FDY | Polyester HOY | Nylon Industrial Yarn |
| | | | Denier Speed | | |
| T.W.P.V. | 120d-36f 3300m/min | 240d-48f 3300m/min | 75d-36f 4800m/min | 75d-36f 6000m/min | 1500d 5500m/min |
| 30 m/s | X Collapsed Package | X Collapsed Package | NA | NA | NA |
| 35 m/s | Δ Low Density | Δ Low Density | NA | NA | X Low Density |

TABLE III-continued

| | Yarn Type | | | | |
|---|---|---|---|---|---|
| | Polyester POY | Polyester POY | Polyester FDY | Polyester HOY | Nylon Industrial Yarn |
| | | | Denier Speed | | |
| T.W.P.V. | 120d-36f 3300m/min | 240d-48f 3300m/min | 75d-36f 4800m/min | 75d-36f 6000m/min | 1500d 5500m/min |
| 40 m/s | Package with Rather Large Bulge ○ | Package with Rather Large Bulge ○ | X Winding was impossible. | NA | and Collapsed Package X Low Density Package |
| 45 m/s | Relatively Low Density Package ○ | Relatively Low Density Package ○ | Δ Relatively poor shaped Package with Loops | X Winding was impossible | ○ |
| 50 m/s | ○ | ○ | ○ | Δ Package of Relatively poor shape with Loops | ○ |
| 55 m/s | Δ Relatively Large Spiral | Δ Relatively Large Spiral | ○ | ○ | ○ |
| 60 m/s | X Hard Package with much Spiraling | X Package with much Spiraling and Saddling | ○ | ○ | Δ |
| 65 m/s | X Hard Package with much Spiraling | X Hard Package with Poor Shape | Δ Package with much Saddling | ○ | X Hard Package with Poor Shape |
| 70 m/s | NA | X Hard Package with Poor Shape | X Package with Poor Shape and much Spiraling | Δ Package with much Saddling | X Package with Poor Shape and much Spiraling |
| 75 m/s | NA | NA | X Package with Poor Shape | X Package with Poor shape and much Spiraling | NA |

In the Table, ○: Good, Δ: Fairly Good and X: Bad

As will be understood from the table III, in the above test, in a range of the taking up speeds, during winding from, 3,300 m/min to 6,000 m/min and in a range of yarn thicknesses of 75d to 240d, it can be concluded that, to obtain a desired shape of a finished package, the transverse wave propagation velocity (T.W.P.V.) should be in a range between 40 to 70 m/s, preferably between 45 to 65 m/s. Namely, when the transverse wave propagation velocity is higher than 70 m/s, defects such as saddling phenomenon or spiraling is apt to be generated. On the other hands, when the transverse wave propagation velocity is slower than 40 m/s, a defect such as bulging is apt to be generated, which easily causes a wound part (spiral part) to be displaced, thereby damaging a package shape. Thus, the inventor has concluded that, in place of control of a winding by measuring a yarn tension in the prior art, the propagation velocity of transverse wave can be used as a measure of a control of a winding condition in a spinning factory.

According to the result of the test, the inventor has found a following an experimental equation of a desired propagation velocity V(m/s) of the transverse wave with respect to a winding speed v, $$4.3 \times v^{0.765} - v < V < 5.1 \times v^{0.765} - v \qquad (8).$$

More preferably, the winding speed v should be controlled so as to obtain a transverse wave propagation velocity V determined by the following equation, $$V = 4.7 \times v^{0.765} - v \qquad (9).$$

In view of the above the transverse wave propagation velocity should be maintained in a range from 35 m/s to 75 m/s.

FIG. 25 shows a fifth embodiment directed to a desired control of a shape of a yarn package in accordance with a factor related a yarn tension during a winding, that is a propagation velocity of a transverse wave generated in the yarn. In place of detecting a transverse wave as generated by the existing traversing guide 33 in a winding machine or a melt spinning machine as is the case in the fourth embodiment, the embodiment features an independent provision of a vibration applying unit 1 having the similar structure as explained in the first embodiment with reference to FIGS. 2 to 3. Thus, a detailed explanation of the unit 1 is eliminated to save a repeated explanation. The vibration applying unit 5 can be arranged at a desired location of a yarn path 100.

In a similar way as explained with reference to the first embodiment, an oscillating signal of a frequency in a range between 30 to 40 KHz from an oscillator 8 is applied to a gate 10 which is opened by a high state signal from a multi-vibrator 9, which is issued for a time period of $t_2$ followed by the duration time period of $t_1$. as shown in FIG. 5(a), which are of a duration in a range of 20 to 50 m/sec. Thus, similar to the first embodiment, the piezoelectric element 6 connected to the gate 10 is operated by the oscillating signal from the oscillator 8 modulated by the ON/OFF signal from the multivibrator. As a result, a vibration is applied to the yarn 100, so that a transverse wave is generated in the yarn.

Arranged at a distance L from the vibration applying unit 1 is a transverse wave detecting unit 11, which has the similar structure to that in the first embodiment. Namely, similar to the first embodiment, the detecting unit 11 may be constructed as a piezoelectric element or otherwise constructed as described with reference to FIGS. 12 to 14. Furthermore, the arrangement as explained with reference to FIGS. 21 to 23 is also possible. Thus, the detector 11 receives the transmitted transverse wave as shown in FIG. 6(a). The transverse wave detector 11 is connected to the measuring circuit 2 having the same construction as that in the first embodiment, i.e., including the time deference detecting circuit 13 and the apparent transverse wave propagation velocity calculating circuit 14. At the time deference detecting circuit 13, as similar to the first embodiment, a time difference (longitudinal wave transmission time) $t_3$ between the start of an application of a vibration and the commencement of a receipt of a transverse wave and a time difference (transverse wave transmission time) $t_4$ between a de-energization of the oscillating signal and the finish of the receipt of the transverse wave as explained with reference to FIGS. 5(a) to (b) and 6(a) and (b) in the first embodiment. The circuit 14 calculates an apparent transverse wave propagation velocity based on the time difference $t_4$ and the distance L ($L/t_4$).

In this embodiment, a circuit 3, in FIG. 1, for calculating a yarn tension is unnecessary. Thus, the circuit 13 is directly connected to the output interface 4, with which the keyboard 19, the CRT 20 and the printing device are connected.

As to the construction in FIG. 25, a measurement of the transverse wave propagation velocity is done under the following conditions.

Frequency of oscillating signal from the multi-vibrator: 30 KHz

Duration time of the ON/OFF signal from the multi-vibrator: 0.020 seconds, and

Distance between vibration applying unit 1 and the transverse wave detector: 0.1 meter According to the test, a result which is similar to that in the fourth was obtained. Thus, it is clear that an increased compatibility between the measurement devices is obtained unlike the method for monitoring a yarn winding in a prior art.

In the above embodiment, the measurement of the transverse wave is done when the yarn is moving downwardly. However, the measurement can be done even if the yarn is moving upwardly. In this case, the speed of the transverse wave moving upwardly is calculated as the speed of the transverse wave moving downwardly minus twice of the yarn moving speed.

In this embodiment, the relationship between the winding speed and the transverse wave propagation velocity is as shown in FIG. 26 when a polyester FDY yarn of thickness of 75d and of a filament number of 36 is wound. As will be easily seen from FIG. 26, an increase in the yarn winding speed causes the transverse wave propagation velocity to be increased. By using this relationship, a winding up speed is suitably controlled so that the transverse wave propagation velocity is controlled to an optimum value. On the contrary, an automatic control of the winding up speed in accordance with the transverse wave propagation velocity can also be done.

What is claimed is:

1. A yarn winding device, comprising:

means for winding a yarn while the yarn is moved along a yarn path at a predetermined speed;

means for applying a traversing movement of the yarn along the yarn path at a location upstream from said winding means;

first detecting means for detecting a first location of the yarn subjected to the traverse movement by said traverse movement applying means;

second detecting means for detecting a transverse wave as generated by the traverse movement and transmitted to a second location spaced from said first location;

means for calculating an apparent propagation velocity of the transverse wave based on a time from the generation of the traversing detected by said first detecting means to the receipt of the transverse wave detected by said second detecting means;

means for calculating a true propagation velocity of the transverse wave based on said yarn speed and the apparent propagation velocity of the transverse wave, and;

means for calculating a yarn tension based on the true propagation velocity of the transverse wave.

2. A yarn winding device according to claim 1, wherein said first detecting means detect a traversing position of said traversing movement applying means.

3. A yarn winding device according to claim 1, wherein said first detecting means detect the yarn at the first location spaced from traversing movement applying means in an upstream direction in the movement of the yarn to be wound.

4. A yarn winding device according to claim 1, wherein said second detecting means comprise a photoelectric transducer of a reflective type having a light emitter for emitting a light and a light receiver for receiving a light reflected from the yarn, said light emitter emitting the light from a location outside from the yarn in plane parallel to a traversing plane of the yarn.

5. A method for winding a yarn, comprising steps of:

moving the yarn along a yarn path and winding the yarn to a package while applying a traversing movement to the yarn;

detecting a first location of the yarn subjected to the traversing movement applying a vibration to the yarn at the first location in the yarn path so that a transverse wave is generated in the yarn;

detecting an apparent propagation velocity of the transverse wave at a second location in the yarn path spaced from the first location as a factor of a tension of the yarn, and;

controlling the winding of the yarn in accordance with the detected apparent propagation velocity of the transverse wave.

6. A method according to claim 5, wherein said controlling comprises a step of controlling the winding speed such that an apparent propagation velocity of the transverse wave in the yarn in the direction opposite to the direction of the movement of the yarn is controlled to a value in a range 40 to 70 m/sec.

* * * * *